US012118922B2

(12) United States Patent
Kim et al.

(10) Patent No.: US 12,118,922 B2
(45) Date of Patent: Oct. 15, 2024

(54) DISPLAY APPARATUS

(71) Applicant: LG ELECTRONICS INC., Seoul (KR)

(72) Inventors: Jinyeol Kim, Seoul (KR); Dongchul Lee, Seoul (KR); Bohee Han, Seoul (KR); Jonggon Shin, Seoul (KR); Jongjin Woo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 40 days.

(21) Appl. No.: 18/021,984

(22) PCT Filed: Aug. 24, 2020

(86) PCT No.: PCT/KR2020/011263
§ 371 (c)(1),
(2) Date: Feb. 17, 2023

(87) PCT Pub. No.: WO2022/045379
PCT Pub. Date: Mar. 3, 2022

(65) Prior Publication Data
US 2023/0306897 A1 Sep. 28, 2023

(51) Int. Cl.
*G09G 3/20* (2006.01)
*G09G 3/32* (2016.01)

(52) U.S. Cl.
CPC ....... *G09G 3/32* (2013.01); *G09G 2300/0408* (2013.01); *G09G 2310/0267* (2013.01); *G09G 2310/0275* (2013.01); *G09G 2330/06* (2013.01)

(58) Field of Classification Search
CPC ............. G09G 3/32; G09G 2300/0408; G09G 2310/0267
USPC ........................................................... 345/55
See application file for complete search history.

(56) References Cited

U.S. PATENT DOCUMENTS

2006/0072060 A1* 4/2006 Lu .......................... H05K 3/323 349/151
2009/0153790 A1 6/2009 Tashiro
2012/0075268 A1* 3/2012 Chung .................. H05K 1/148 345/204
2014/0104252 A1* 4/2014 Park .................... G02F 1/13452 345/205
2018/0049324 A1* 2/2018 Koo .................... H01L 25/0655

FOREIGN PATENT DOCUMENTS

KR 10-0677812 B1 2/2007
KR 10-0788388 B1 12/2007
KR 10-0864501 B1 10/2008
KR 10-2015-0072509 A 6/2015

* cited by examiner

*Primary Examiner* — Jonathan M Blancha
(74) *Attorney, Agent, or Firm* — Birch, Stewart, Kolasch & Birch, LLP

(57) ABSTRACT

A display apparatus according to embodiments may comprise: a PCB comprising a plurality of layers having a circuit printed thereon; a plurality of driver ICs which transmit at least one signal and are attached to the inside of the PCB; a driver circuit connecting the driver ICs in a first direction; scan ICs included in the driver ICs, respectively; a scan circuit connecting the scan ICs in the first direction and not crossing the driver circuit; and a controller that controls at least one of the driver ICs, the driver circuit, and the scan circuit.

7 Claims, 20 Drawing Sheets

(a) (b) (c) (d)

(a)

(b)

(c)

(a)

(b)

(c)

DISPLAY APPARATUS

CROSS REFERENCE TO RELATED APPLICATION

This application is the National Phase of PCT International Application No. PCT/KR2020/011263, filed on Aug. 24, 2020, which is hereby expressly incorporated by reference into the present application.

TECHNICAL FIELD

The present disclosure relates to a display device, and more particularly, to a connection circuit pattern among a plurality of Integrated Circuits (ICs) in a driving module for controlling a screen for example.

BACKGROUND ART

Recently, in the field of display technology, display devices having excellent properties such as thinness, flexibility and the like have been developed. On the other hand, major displays that are currently commercialized are represented by Liquid Crystal Display (LCD) and Organic Light Emitting Diodes (OLED).

Meanwhile, Light Emitting Diode (LED) is a semiconductor light emitting element well known for converting current into light, and has been used as a display image light source for electronic devices including information communication devices together with GaP:N series of green LED, starting in 1962 with a commercialization of red LED using GaAsP compound semiconductors.

And, compared to a filament-based light-emitting device, the semiconductor light emitting element has various advantages such as long life, low power consumption, excellent initial driving characteristics, high vibration resistance, etc.

A display that displays a screen using an LED may include a micro LED having a high-density arrangement to represent a high-resolution screen. In order to display a screen by controlling the LED, it is necessary to control the LED by a display driving module.

In order to implement a screen having a high resolution, a demand value of the degree of integration of LED pixels included in a display device is increasing. The existing technology was mainly required to have an integration degree of pitch 1.0 mm or more, but recently, a product of pitch 1.0 mm or less tends to be required. Therefore, the required performance and/or numbers of driver ICs and scan ICs included in a driving module are also increasing to control a large number of pixels.

The driving module may include a PCB in which several printed circuit boards are stacked, and it is common to use a bypass method after forming via holes in other layers to avoid crossing wires in a specific layer.

For example, when crossing between conducting wires occurs in a specific layer of a PCB substrate having a multilayer structure, a via hole is used to bypass it. However, the wire that passes through the via hole is disposed vertically from one layer to another, thereby causing Electro-Magnetic Interference (EMI) and noise in relation to other wires.

In addition, there is a problem in that the fabrication difficulty of PCB increases when a via hole is formed.

DETAILED DESCRIPTION

Technical Task

One technical task of the present disclosure is to solve the problems of the related art described above and to provide a new solution for fundamentally removing a via hole, especially in the PCB design of a display driving module.

More specifically, for example, a plurality of driver ICs and a plurality of scan ICs in a driving module of a display device according to embodiments are arranged in parallel and connected through a driver circuit and a scan circuit arranged in parallel, respectively to eliminate interference between the circuits. When the interference between the circuits disappears, all ICs may be connected to a controller without forming a via hole toward another layer.

Technical Solutions

In one technical aspect of the present disclosure, provided is a display device having a driving module including a PCB including a plurality of circuit printed layers, a plurality of driver ICs attached to the PCB to transmit at least one signal and including a plurality of scan ICs inside, respectively, a driver circuit connecting a first driver IC and a second driver IC among a plurality of the driver ICs together in a first direction, a scan circuit connecting a first scan IC included inside the first driver IC and a second scan IC included inside the second driver IC together in the first direction without crossing with the driver circuit, and a controller controlling at least one of a plurality of the driver ICs, the driver circuit, or the scan circuit.

A plurality of the driver ICs may generate first to fourth signals, respectively and the first to fourth signals may include different informations, respectively.

The driver circuit may include a first circuit transmitting the first signal, a second circuit transmitting the second signal, a third circuit transmitting the third signal, and a fourth circuit transmitting the fourth signal, and the fourth circuit may include at least one sub-circuit.

The first to third circuits may be formed parallel to the first direction to connect a plurality of the driver ICs, and the at least one sub-circuit may be configured so that a pattern in a direction different from the first direction exists twice or less when connecting the first driver IC and the second driver IC in the first direction.

An area having the first and second driver ICs connected to each other therein may have a rectangular shape, and the first to fourth circuits may exist only within a first area having the first and second driver ICs connected to each other therein.

The first area may include first and second boundaries parallel to the first direction, and all the first to fourth circuits may exist between the first and second boundaries.

The driver IC may include a first pin having the first circuit connected thereto, a second pin having the second circuit connected thereto, a third pin having the third circuit connected thereto, and a fourth pin having the fourth circuit connected thereto.

In another technical aspect of the present disclosure, provided is a display device, including a PCB including a plurality of circuit printed layers, a plurality of driver ICs attached to the PCB to transmit at least one signal, a plurality of scan ICs attached to the PCB in a manner of being located at positions different from those of a plurality of the driver ICs, a driver circuit connecting a first driver IC and a second driver IC among a plurality of the driver ICs together in a first direction, a scan circuit connecting a first scan IC and a second scan IC among a plurality of the scan ICs together in the first direction, and a controller controlling at least one of a plurality of the driver ICs, a plurality of the scan ICs, the driver circuit, or the scan circuit.

The driver IC may generate a clock signal and a data signal and include at least one pin related to the clock signal and a pin related to the data signal, and the driver circuit may include at least one clock signal circuit transmitting the clock signal and a data signal circuit transmitting the data signal.

An area having each of the first and second driver ICs located on the PCB therein may include four surfaces, the four surfaces of the first driver IC located area may include a first specific surface facing the second driver IC, and the four surfaces of the second driver IC located area may include a second specific surface facing the first driver IC The first specific surface may be a surface closest to the second driver IC located area, the second specific surface may be a surface closest to the first driver IC located area, and the first and second specific surfaces may be parallel to each other.

Based on the clock signal related pin located relatively closer to the first specific surface than the data signal related pin, the clock signal circuit may cross with the first specific surface and also cross with a surface different from the second specific surface.

The surface different from the second specific surface may be a surface parallel to the first direction.

Based on the clock signal related pin located relatively farther from the first specific surface than the data signal related pin, the clock signal circuit may cross with a surface different from the second specific surface and also cross with the first specific surface.

The surface different from the second specific surface may be a surface parallel to the first direction.

Advantageous Effects

By a method of designing a circuit board of a driving module according to one embodiment of the present disclosure, a plurality of scan ICs and/or driver ICs may be connected in parallel in a specific direction using different parallel circuit structures. Since there is no intersection of conductive wires between the circuits placed parallel, a PCB does not require a via hole.

Furthermore, when a PCB having a stacked structure without a via hole is used, electromagnetic interference between conductive wires respectively printed on boards substrate may be minimized. In addition, there are an effect of lowering power consumption of a driving module and a technical effect of reducing heat generation.

According to more specific experimental results, when a driving module of a display device according to one embodiment of the present disclosure is used, power consumption may be reduced by about 1 W for 50 driver ICs and/or scan ICs.

BEST MODE FOR INVENTION

Reference will now be made in detail to embodiments of the present disclosure, examples of which are illustrated in the accompanying drawings. Wherever possible, the same reference numbers will be used throughout the drawings to refer to the same or like parts, and redundant description thereof will be omitted. As used herein, the suffixes "module" and "unit" are added or used interchangeably to facilitate preparation of this specification and are not intended to suggest distinct meanings or functions. In describing embodiments disclosed in this specification, relevant well-known technologies may not be described in detail in order not to obscure the subject matter of the embodiments disclosed in this specification. In addition, it should be noted that the accompanying drawings are only for easy understanding of the embodiments disclosed in the present specification, and should not be construed as limiting the technical spirit disclosed in the present specification.

Furthermore, although the drawings are separately described for simplicity, embodiments implemented by combining at least two or more drawings are also within the scope of the present disclosure.

In addition, when an element such as a layer, region or module is described as being "on" another element, it is to be understood that the element may be directly on the other element or there may be an intermediate element between them.

The display device described herein is a concept including all display devices that display information with a unit pixel or a set of unit pixels. Therefore, the display device may be applied not only to finished products but also to parts. For example, a panel corresponding to a part of a digital TV also independently corresponds to the display device in the present specification. The finished products include a mobile phone, a smartphone, a laptop, a digital broadcasting terminal, a personal digital assistant (PDA), a portable multimedia player (PMP), a navigation system, a slate PC, a tablet, an Ultrabook, a digital TV, a desktop computer, and the like.

However, it will be readily apparent to those skilled in the art that the configuration according to the embodiments described herein is applicable even to a new product that will be developed later as a display device.

In addition, the semiconductor light emitting element mentioned in this specification is a concept including an LED, a micro LED, and the like, and may be used interchangeably therewith.

Figure 1:
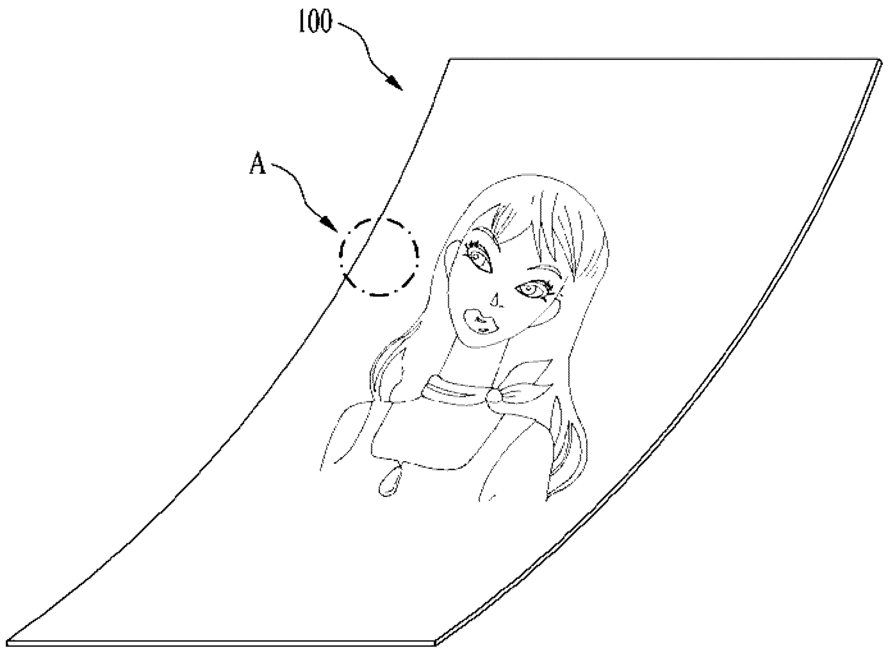
FIG. 1 is a conceptual diagram illustrating an embodiment of a display device using a semiconductor light emitting element according to the present disclosure.

FIG. 1 is a conceptual view illustrating an embodiment of a display device using a semiconductor light emitting element according to the present disclosure.

As shown in FIG. 1, information processed by a controller (not shown) of a display device 100 may be displayed using a flexible display.

The flexible display may include, for example, a display that can be warped, bent, twisted, folded, or rolled by external force.

Furthermore, the flexible display may be, for example, a display manufactured on a thin and flexible substrate that can be warped, bent, folded, or rolled like paper while maintaining the display characteristics of a conventional flat panel display.

When the flexible display remains in an unbent state (e.g., a state having an infinite radius of curvature) (hereinafter referred to as a first state), the display area of the flexible display forms a flat surface. When the display in the first state is changed to a bent state (e.g., a state having a finite radius of curvature) (hereinafter referred to as a second state) by external force, the display area may be a curved surface. As shown in FIG. 1, the information displayed in the second state may be visual information output on a curved surface. Such visual information may be implemented by independently controlling the light emission of sub-pixels arranged in a matrix form. The unit pixel may mean, for example, a minimum unit for implementing one color.

The unit pixel of the flexible display may be implemented by a semiconductor light emitting element. In the present disclosure, a light emitting diode (LED) is exemplified as a type of the semiconductor light emitting element configured to convert electric current into light. The LED may be formed in a small size, and may thus serve as a unit pixel even in the second state.

Hereinafter, a flexible display implemented using the LED will be described in more detail with reference to the drawings.

Figure 2:
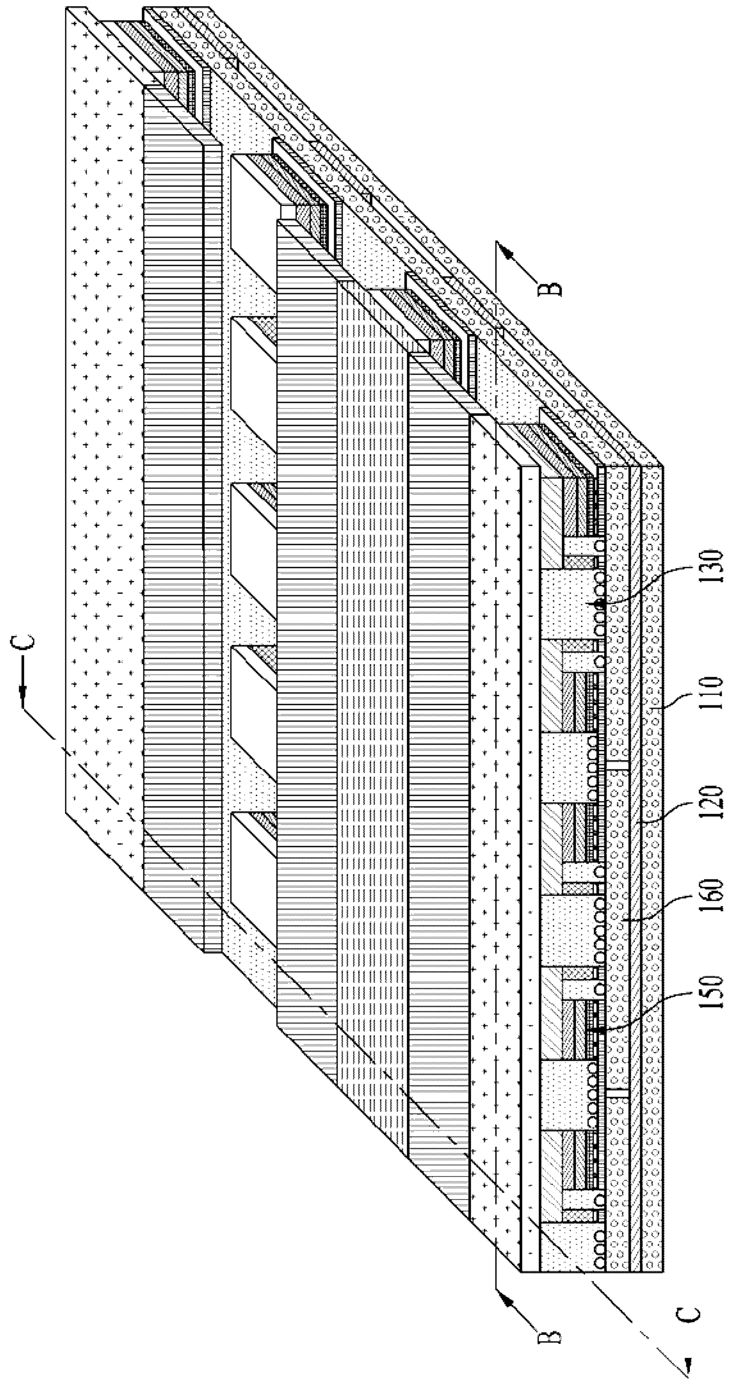
FIG. 2 is a partially enlarged diagram showing a part A shown in FIG. 1.

FIG. 2 is a partially enlarged view showing part A of FIG. 1.

Figure 3A:
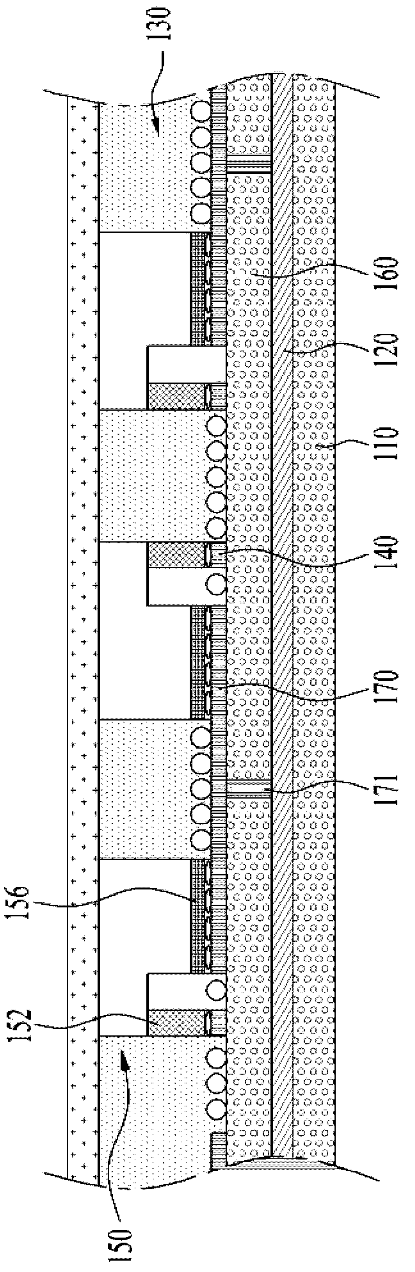
FIGS. 3A and 3B are cross-sectional diagrams taken along the cutting lines B-B and C-C in FIG. 2.
Figure 3B:
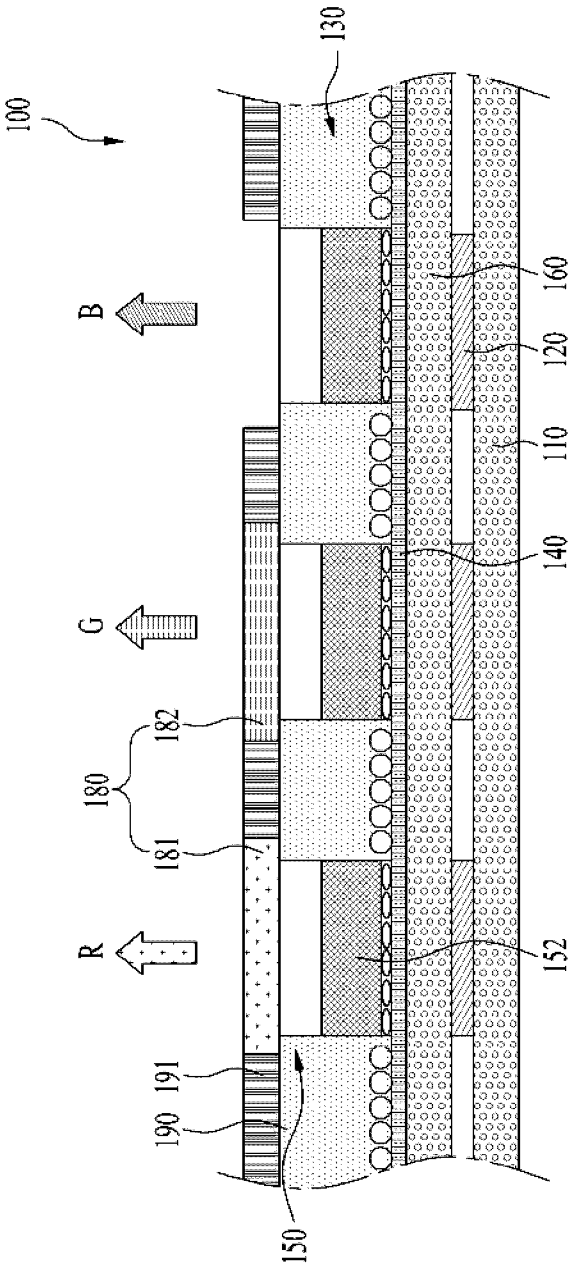

FIGS. 3A and 3B are cross-sectional views taken along lines B-B and C-C in FIG. 2.

Figure 4:
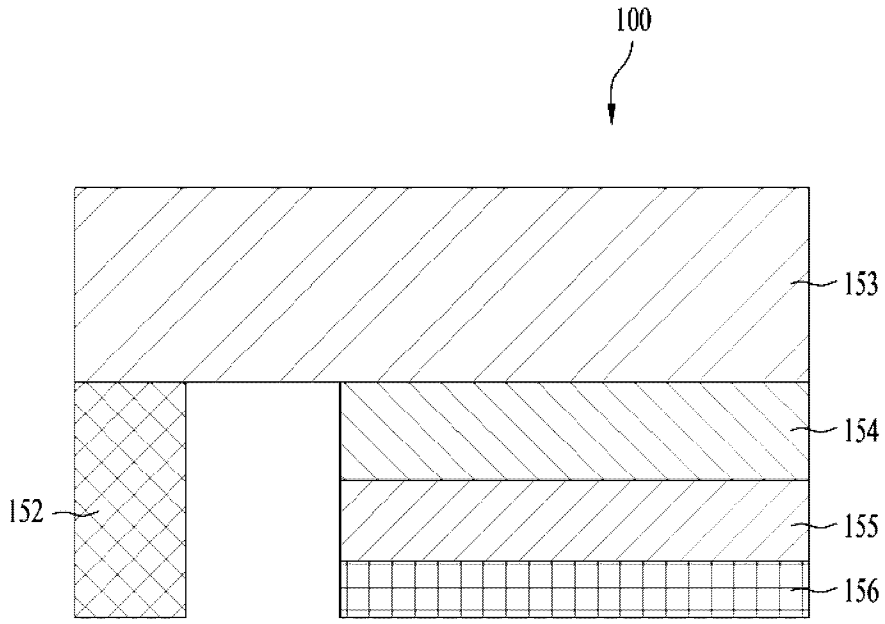
FIG. 4 is a conceptual diagram illustrating the flip-chip type semiconductor light emitting element of FIG. 3.

FIG. 4 is a conceptual view illustrating the flip-chip type semiconductor light emitting element of FIG. 3.

Figure 5A:
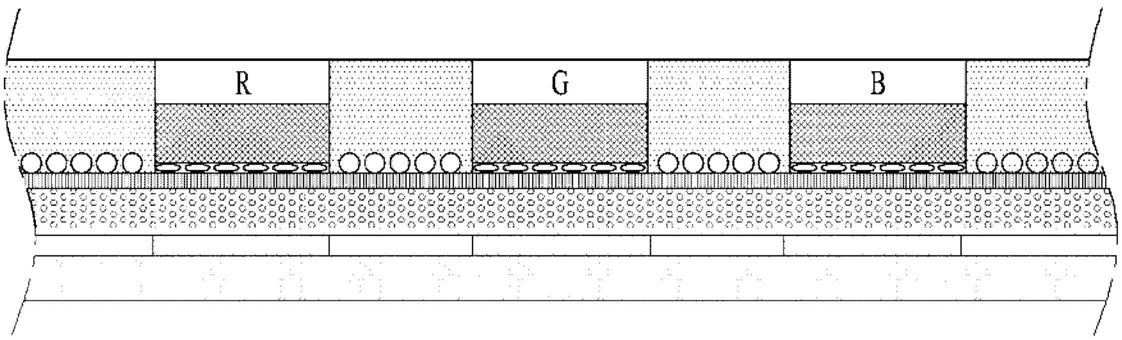
FIGS. 5A to 5C are conceptual diagrams illustrating various examples of color implementation with respect to a flip-chip type semiconductor light emitting element.
Figure 5B:
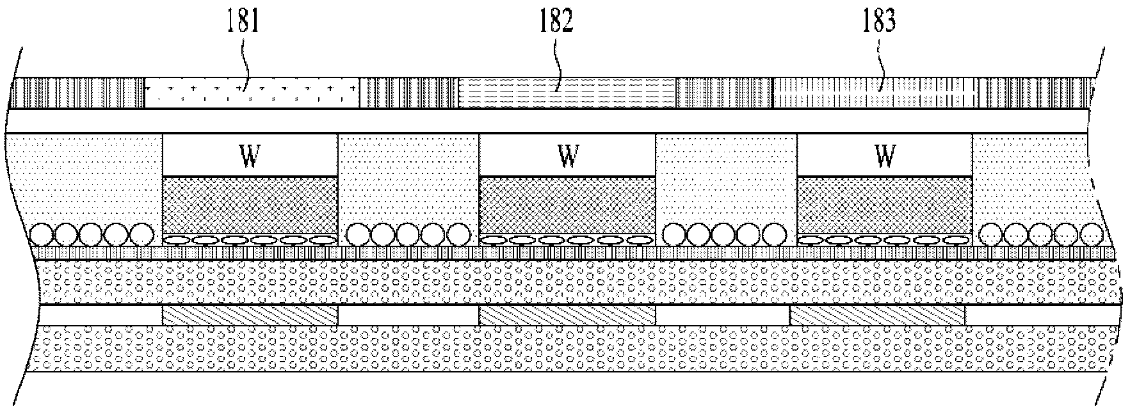
Figure 5C:
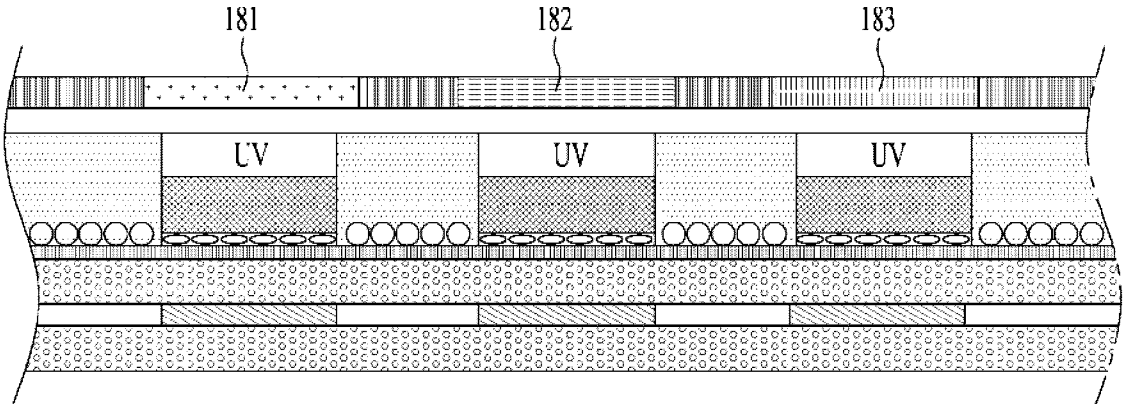

FIGS. 5A to 5C are conceptual views illustrating various examples of implementation of colors in relation to a flip-chip type semiconductor light emitting element.

As shown in FIGS. 2, 3A and 3B, the display device 100 using a passive matrix (PM) type semiconductor light emitting element is exemplified as the display device 100 using a semiconductor light emitting element. However, the examples described below are also applicable to an active matrix (AM) type semiconductor light emitting element.

The display device 100 shown in FIG. 1 may include a substrate 110, a first electrode 120, a conductive adhesive layer 130, a second electrode 140, and at least one semiconductor light emitting element 150, as shown in FIG. 2.

The substrate 110 may be a flexible substrate. For example, to implement a flexible display device, the substrate 110 may include glass or polyimide (PI). Any insulative and flexible material such as polyethylene naphthalate (PEN) or polyethylene terephthalate (PET) may be employed. In addition, the substrate 110 may be formed of either a transparent material or an opaque material.

The substrate 110 may be a wiring substrate on which the first electrode 120 is disposed. Thus, the first electrode 120 may be positioned on the substrate 110.

As shown in FIG. 3A, an insulating layer 160 may be disposed on the substrate 110 on which the first electrode 120 is positioned, and an auxiliary electrode 170 may be positioned on the insulating layer 160. In this case, a stack in which the insulating layer 160 is laminated on the substrate 110 may be a single wiring substrate. More specifically, the insulating layer 160 may be formed of an insulative and flexible material such as PI, PET, or PEN, and may be integrated with the substrate 110 to form a single substrate.

The auxiliary electrode 170, which is an electrode that electrically connects the first electrode 120 and the semiconductor light emitting element 150, is positioned on the insulating layer 160, and is disposed to correspond to the position of the first electrode 120. For example, the auxiliary electrode 170 may have a dot shape and may be electrically connected to the first electrode 120 by an electrode hole 171 formed through the insulating layer 160. The electrode hole 171 may be formed by filling a via hole with a conductive material.

As shown in FIG. 2 or 3A, a conductive adhesive layer 130 may be formed on one surface of the insulating layer 160, but embodiments of the present disclosure are not limited thereto. For example, a layer performing a specific function may be formed between the insulating layer 160 and the conductive adhesive layer 130, or the conductive adhesive layer 130 may be disposed on the substrate 110 without the insulating layer 160. In a structure in which the conductive adhesive layer 130 is disposed on the substrate 110, the conductive adhesive layer 130 may serve as an insulating layer.

The conductive adhesive layer 130 may be a layer having adhesiveness and conductivity. For this purpose, a material having conductivity and a material having adhesiveness may be mixed in the conductive adhesive layer 130. In addition, the conductive adhesive layer 130 may have ductility, thereby providing making the display device flexible.

As an example, the conductive adhesive layer 130 may be an anisotropic conductive film (ACF), an anisotropic conductive paste, a solution containing conductive particles, or the like. The conductive adhesive layer 130 may be configured as a layer that allows electrical interconnection in the direction of the Z-axis extending through the thickness, but is electrically insulative in the horizontal X-Y direction. Accordingly, the conductive adhesive layer 130 may be referred to as a Z-axis conductive layer (hereinafter, referred to simply as a "conductive adhesive layer").

The ACF is a film in which an anisotropic conductive medium is mixed with an insulating base member. When the ACF is subjected to heat and pressure, only a specific portion thereof becomes conductive by the anisotropic conductive medium. Hereinafter, it will be described that heat and pressure are applied to the ACF. However, another method may be used to make the ACF partially conductive. The other method may be, for example, application of only one of the heat and pressure or UV curing.

In addition, the anisotropic conductive medium may be, for example, conductive balls or conductive particles. For example, the ACF may be a film in which conductive balls are mixed with an insulating base member. Thus, when heat and pressure are applied to the ACF, only a specific portion of the ACF is allowed to be conductive by the conductive balls. The ACF may contain a plurality of particles formed by coating the core of a conductive material with an insulating film made of a polymer material. In this case, as the insulating film is destroyed in a portion to which heat and pressure are applied, the portion is made to be conductive by the core. At this time, the cores may be deformed to form layers that contact each other in the thickness direction of the film. As a more specific example, heat and pressure are applied to the whole ACF, and an electrical connection in the Z-axis direction is partially formed by the height difference of a counterpart adhered by the ACF.

As another example, the ACF may contain a plurality of particles formed by coating an insulating core with a conductive material. In this case, as the conductive material is deformed (pressed) in a portion to which heat and pressure are applied, the portion is made to be conductive in the thickness direction of the film. As another example, the conductive material may be disposed through the insulating base member in the Z-axis direction to provide conductivity in the thickness direction of the film. In this case, the conductive material may have a pointed end.

The ACF may be a fixed array ACF in which conductive balls are inserted into one surface of the insulating base member. More specifically, the insulating base member may be formed of an adhesive material, and the conductive balls may be intensively disposed on the bottom portion of the insulating base member. Thus, when the base member is subjected to heat and pressure, it may be deformed together with the conductive balls, exhibiting conductivity in the vertical direction.

However, the present disclosure is not necessarily limited thereto, and the ACF may be formed by randomly mixing conductive balls in the insulating base member, or may be composed of a plurality of layers with conductive balls arranged on one of the layers (as a double-ACF).

The anisotropic conductive paste may be a combination of a paste and conductive balls, and may be a paste in which conductive balls are mixed with an insulating and adhesive base material. Also, the solution containing conductive particles may be a solution containing any conductive particles or nanoparticles.

Referring back to FIG. 3A, the second electrode 140 is positioned on the insulating layer 160 and spaced apart from the auxiliary electrode 170. That is, the conductive adhesive layer 130 is disposed on the insulating layer 160 having the auxiliary electrode 170 and the second electrode 140 positioned thereon.

After the conductive adhesive layer 130 is formed with the auxiliary electrode 170 and the second electrode 140 positioned on the insulating layer 160, the semiconductor light emitting element 150 is connected thereto in a flip-chip form by applying heat and pressure. Thereby, the semiconductor light emitting element 150 is electrically connected to the first electrode 120 and the second electrode 140.

Referring to FIG. 4, the semiconductor light emitting element may be a flip chip-type light emitting device.

For example, the semiconductor light emitting element may include a p-type electrode 156, a p-type semiconductor layer 155 on which the p-type electrode 156 is formed, an active layer 154 formed on the p-type semiconductor layer 155, an n-type semiconductor layer 153 formed on the active layer 154, and an n-type electrode 152 disposed on the n-type semiconductor layer 153 and horizontally spaced apart from the p-type electrode 156. In this case, the p-type electrode 156 may be electrically connected to the auxiliary electrode 170, which is shown in FIG. 3, by the conductive adhesive layer 130, and the n-type electrode 152 may be electrically connected to the second electrode 140.

Referring back to FIGS. 2, 3A and 3B, the auxiliary electrode 170 may be elongated in one direction. Thus, one auxiliary electrode may be electrically connected to the plurality of semiconductor light emitting elements 150. For example, p-type electrodes of semiconductor light emitting elements on left and right sides of an auxiliary electrode may be electrically connected to one auxiliary electrode.

More specifically, the semiconductor light emitting element 150 may be press-fitted into the conductive adhesive layer 130 by heat and pressure. Thereby, only the portions of the semiconductor light emitting element 150 between the p-type electrode 156 and the auxiliary electrode 170 and between the n-type electrode 152 and the second electrode 140 may exhibit conductivity, and the other portions of the semiconductor light emitting element 150 do not exhibit conductivity as they are not press-fitted. In this way, the conductive adhesive layer 130 interconnects and electrically connects the semiconductor light emitting element 150 and the auxiliary electrode 170 and interconnects and electrically connects the semiconductor light emitting element 150 and the second electrode 140.

The plurality of semiconductor light emitting elements 150 may constitute a light emitting device array, and a phosphor conversion layer 180 may be formed on the light emitting device array.

The light emitting device array may include a plurality of semiconductor light emitting elements having different luminance values. Each semiconductor light emitting element 150 may constitute a unit pixel and may be electrically connected to the first electrode 120. For example, a plurality of first electrodes 120 may be provided, and the semiconductor light emitting elements may be arranged in, for example, several columns. The semiconductor light emitting elements in each column may be electrically connected to any one of the plurality of first electrodes.

In addition, since the semiconductor light emitting elements are connected in a flip-chip form, semiconductor light emitting elements grown on a transparent dielectric substrate may be used. The semiconductor light emitting elements may be, for example, nitride semiconductor light emitting elements. Since the semiconductor light emitting element 150 has excellent luminance, it may constitute an individual unit pixel even when it has a small size.

As shown in FIG. 3, a partition wall 190 may be formed between the semiconductor light emitting elements 150. In this case, the partition wall 190 may serve to separate individual unit pixels from each other, and may be integrated with the conductive adhesive layer 130. For example, by inserting the semiconductor light emitting element 150 into the ACF, the base member of the ACF may form the partition wall.

In addition, when the base member of the ACF is black, the partition wall 190 may have reflectance and increase contrast even without a separate black insulator.

As another example, a reflective partition wall may be separately provided as the partition wall 190. In this case, the partition wall 190 may include a black or white insulator depending on the purpose of the display device. When a partition wall including a white insulator is used, reflectivity may be increased. When a partition wall including a black insulator is used, it may have reflectance and increase contrast.

The phosphor conversion layer 180 may be positioned on the outer surface of the semiconductor light emitting element 150. For example, the semiconductor light emitting element 150 may be a blue semiconductor light emitting element that emits blue (B) light, and the phosphor conversion layer 180 may function to convert the blue (B) light into a color of a unit pixel. The phosphor conversion layer 180 may be a red phosphor 181 or a green phosphor 182 constituting an individual pixel.

That is, the red phosphor 181 capable of converting blue light into red (R) light may be laminated on a blue semiconductor light emitting element at a position of a unit pixel of red color, and the green phosphor 182 capable of converting blue light into green (G) light may be laminated on the blue semiconductor light emitting element at a position of a unit pixel of green color. Only the blue semiconductor light emitting element may be used alone in the portion constituting the unit pixel of blue color. In this case, unit pixels of red (R), green (G), and blue (B) may constitute one pixel. More specifically, a phosphor of one color may be laminated along each line of the first electrode 120. Accordingly, one line on the first electrode 120 may be an electrode for controlling one color. That is, red (R), green (G), and blue (B) may be sequentially disposed along the second electrode 140, thereby implementing a unit pixel.

However, embodiments of the present disclosure are not limited thereto. Unit pixels of red (R), green (G), and blue (B) may be implemented by combining the semiconductor light emitting element 150 and the quantum dot (QD) rather than using the phosphor.

Also, a black matrix 191 may be disposed between the phosphor conversion layers to improve contrast. That is, the black matrix 191 may improve contrast of light and darkness.

However, embodiments of the present disclosure are not limited thereto, and anther structure may be applied to implement blue, red, and green colors.

Referring to FIG. 5A, each semiconductor light emitting element may be implemented as a high-power light emitting device emitting light of various colors including blue by using gallium nitride (GaN) as a main material and adding indium (In) and/or aluminum (Al).

In this case, each semiconductor light emitting element may be a red, green, or blue semiconductor light emitting element to form a unit pixel (sub-pixel). For example, red, green, and blue semiconductor light emitting elements R, G, and B may be alternately disposed, and unit pixels of red, green, and blue may constitute one pixel by the red, green and blue semiconductor light emitting elements. Thereby, a full-color display may be implemented.

Referring to FIG. 5B, the semiconductor light emitting element 150*a* may include a white light emitting device W having a yellow phosphor conversion layer, which is provided for each device. In this case, in order to form a unit pixel, a red phosphor conversion layer 181, a green phosphor conversion layer 182, and a blue phosphor conversion layer 183 may be disposed on the white light emitting device W. In addition, a unit pixel may be formed using a color filter repeating red, green, and blue on the white light emitting device W.

Referring to FIG. 5C, a red phosphor conversion layer 181, a green phosphor conversion layer 185, and a blue phosphor conversion layer 183 may be provided on a ultraviolet light emitting device. Not only visible light but also ultraviolet (UV) light may be used in the entire region of the semiconductor light emitting element. In an embodiment, UV may be used as an excitation source of the upper phosphor in the semiconductor light emitting element.

Referring back to this example, the semiconductor light emitting element is positioned on the conductive adhesive layer to constitute a unit pixel in the display device. Since the semiconductor light emitting element has excellent luminance, individual unit pixels may be configured despite even when the semiconductor light emitting element has a small size.

Regarding the size of such an individual semiconductor light emitting element, the length of each side of the device may be, for example, 80 μm or less, and the device may have a rectangular or square shape. When the semiconductor light emitting element has a rectangular shape, the size thereof may be less than or equal to 20 μm×80 μm.

In addition, even when a square semiconductor light emitting element having a side length of 10 μm is used as a unit pixel, sufficient brightness to form a display device may be obtained.

Therefore, for example, in case of a rectangular pixel having a unit pixel size of 600 μm×300 μm (i.e., one side by the other side), a distance of a semiconductor light emitting element becomes sufficiently long relatively.

Thus, in this case, it is able to implement a flexible display device having high image quality over HD image quality.

The above-described display device using the semiconductor light emitting element may be prepared by a new fabricating method. Such a fabricating method will be described with reference to FIG. 6 as follows.

Figure 6:
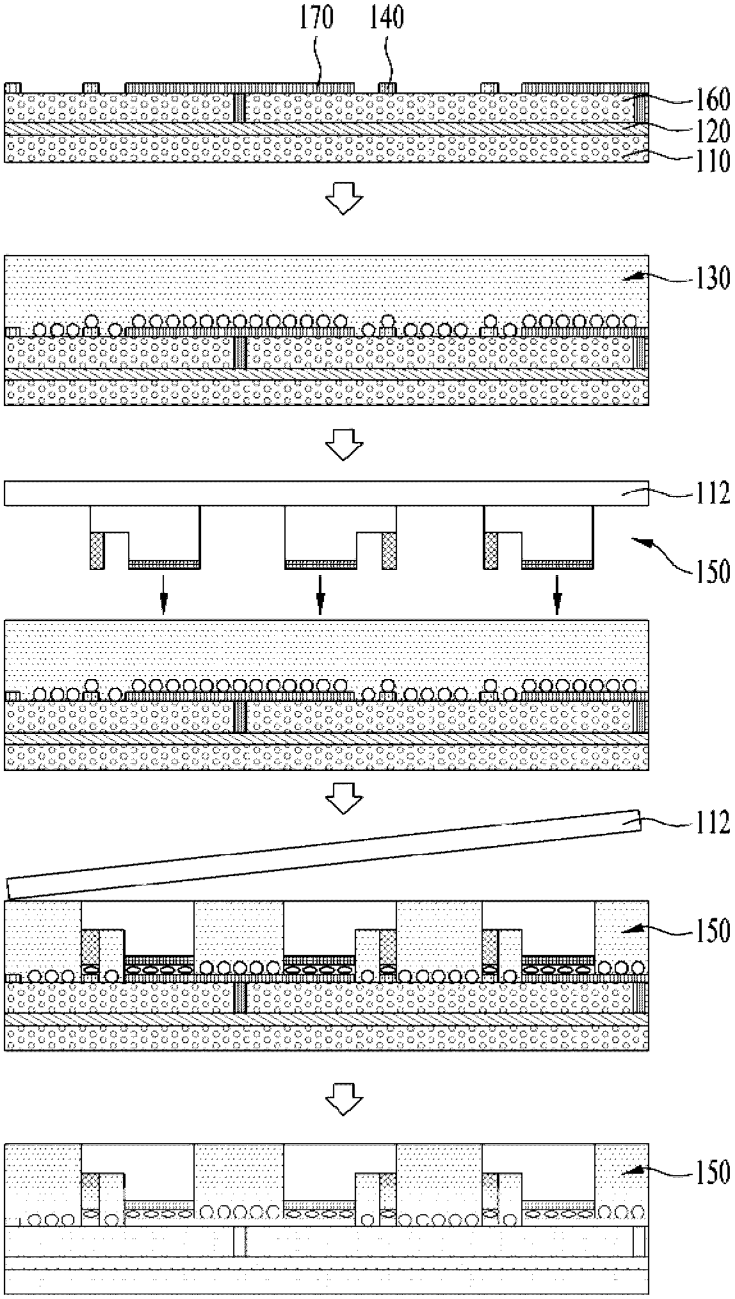
FIG. 6 shows cross-sectional views of a method of fabricating a display device using a semiconductor light emitting element according to the present disclosure.

FIG. 6 shows cross-sectional views of a method of fabricating a display device using a semiconductor light emitting element according to the present disclosure.

Referring to FIG. 6, first of all, a conductive adhesive layer 130 is formed on an insulating layer 160 located between an auxiliary electrode 170 and a second electrode 140. The insulating layer 160 is tacked on a wiring substrate 110. On the wiring substrate 110, a first electrode 120, the auxiliary electrode 170 and the second electrode 140 are disposed. In this case, the first electrode 120 and the second electrode 140 may be disposed in mutually orthogonal directions, respectively. In order to implement a flexible display device, the wiring substrate 110 and the insulating layer 160 may include glass or polyimide (PI) each.

For example, the conductive adhesive layer 130 may be implemented by an anisotropic conductive film. To this end, an anisotropic conductive film may be coated on the substrate on which the insulating layer 160 is located.

Subsequently, a temporary substrate 112, on which a plurality of semiconductor light emitting elements 150 configuring individual pixels are located to correspond to locations of the auxiliary electrode 170 and the second electrodes 140, is disposed in a manner that the semiconductor light emitting element 150 confronts the auxiliary electrode 170 and the second electrode 140.

In this regard, the temporary 112 substrate 112 is a growing substrate for growing the semiconductor light emitting element 150 and may include a sapphire or silicon substrate.

The semiconductor light emitting element is configured to have a space and size for configuring a display device when formed in unit of wafer, thereby being effectively used for the display device.

Subsequently, the wiring substrate 110 and the temporary substrate 112 are thermally compressed together. By the thermocompression, the wiring substrate 110 and the temporary substrate 112 are bonded together. Owing to the property of an anisotropic conductive film having conductivity by thermocompression, only a portion among the semiconductor light emitting element 150, the auxiliary electrode 170 and the second electrode 140 has conductivity, via which the electrodes and the semiconductor light emitting element 150 may be connected electrically. In this case, the semiconductor light emitting element 150 is inserted into the anisotropic conductive film, by which a partition may be formed between the semiconductor light emitting elements 150.

Then the temporary substrate 112 is removed. For example, the temporary substrate 112 may be removed using Laser Lift-Off (LLO) or Chemical Lift-Off (CLO).

Finally, by removing the temporary substrate 112, the semiconductor light emitting elements 150 exposed externally. If necessary, the wiring substrate 110 to which the semiconductor light emitting elements 150 are coupled may be coated with silicon oxide (SiOx) or the like to form a transparent insulating layer (not shown).

In addition, a step of forming a phosphor layer on one side of the semiconductor light emitting element 150 may be further included. For example, the semiconductor light emitting element 150 may include a blue semiconductor light emitting element emitting Blue (B) light, and a red or green phosphor for converting the blue (B) light into a color of a unit pixel may form a layer on one side of the blue semiconductor light emitting element.

The above-described fabricating method or structure of the display device using the semiconductor light emitting element may be modified into various forms. For example, the above-described display device may employ a vertical semiconductor light emitting element.

Furthermore, a modification or embodiment described in the following may use the same or similar reference numbers for the same or similar configurations of the former example and the former description may apply thereto.

Figure 7:
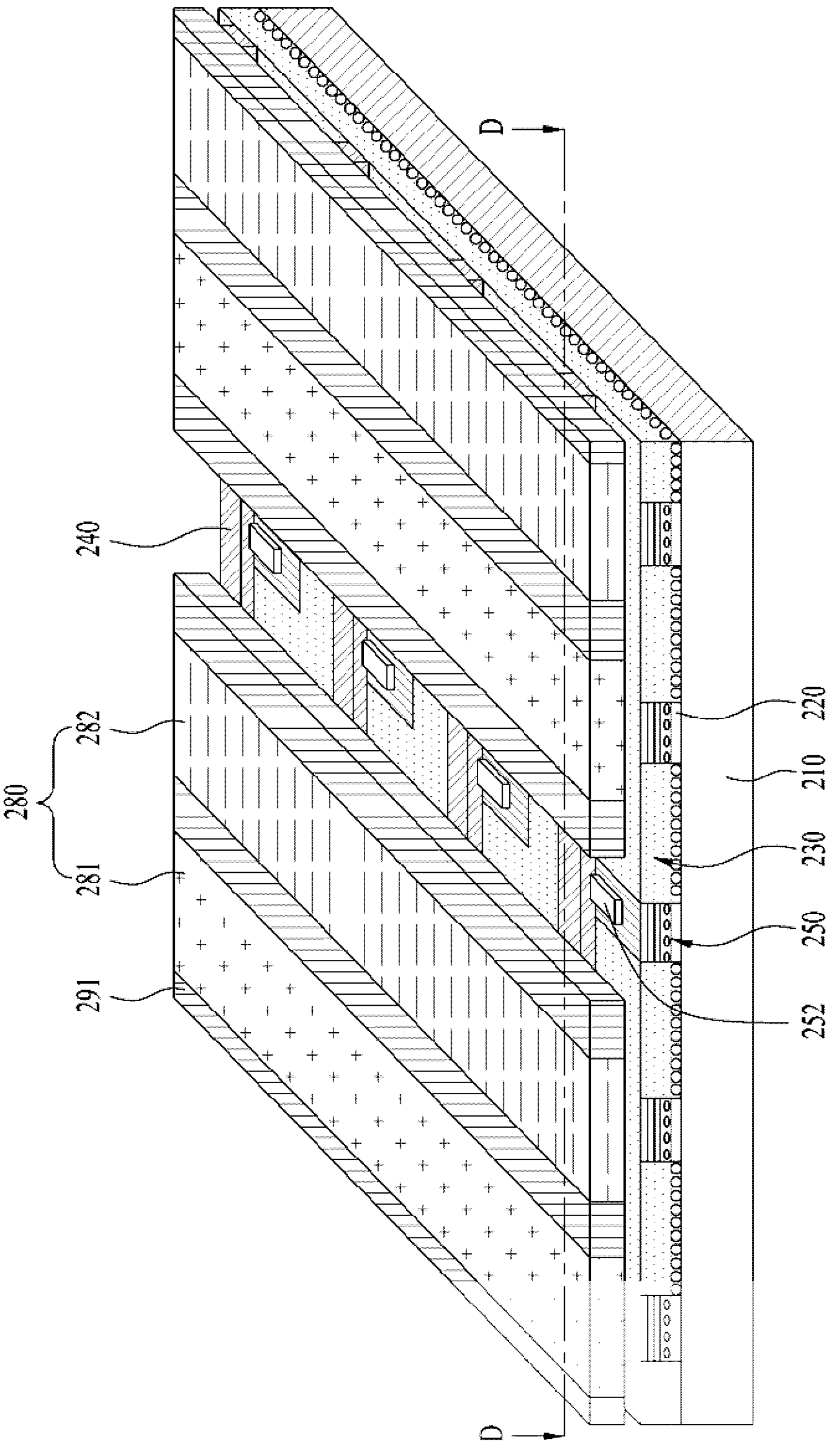
FIG. 7 is a perspective diagram of a display device using a semiconductor light emitting element according to another embodiment of the present disclosure.
Figure 8:
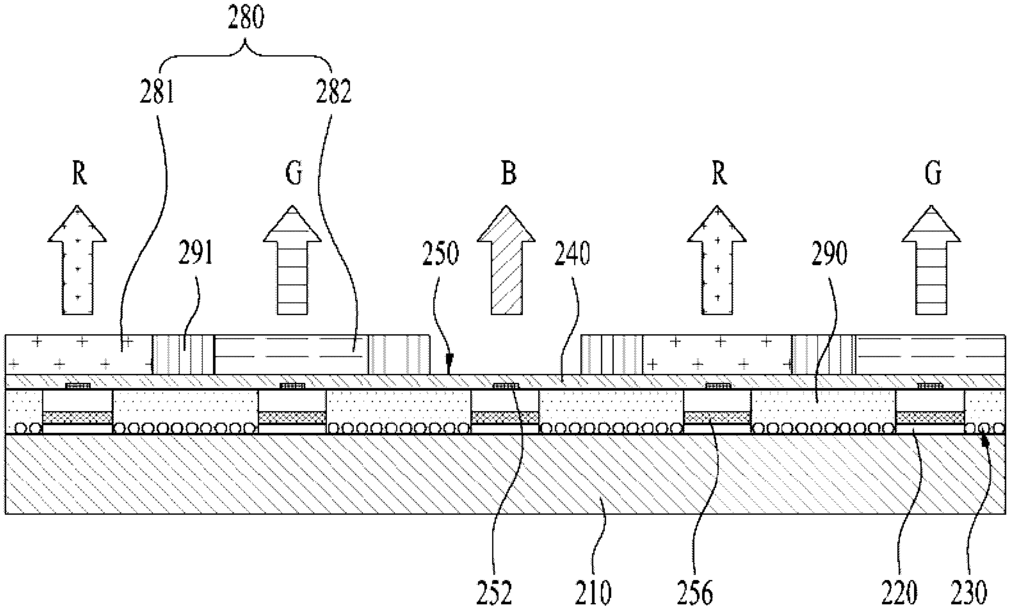
FIG. 8 is a cross-sectional diagram taken along a cutting line D-D shown in FIG. 8.
Figure 9:
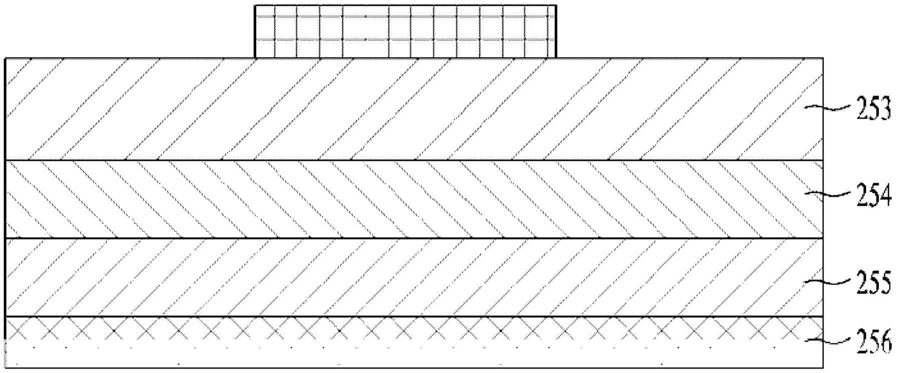
FIG. 9 is a conceptual diagram showing a vertical type semiconductor light emitting element shown in FIG. 8.

FIG. 7 is a perspective diagram of a display device using a semiconductor light emitting element according to another embodiment of the present disclosure, FIG. 8 is a cross-sectional diagram taken along a cutting line D-D shown in FIG. 8, and FIG. 9 is a conceptual diagram showing a vertical type semiconductor light emitting element shown in FIG. 8.

Referring to the present drawings, a display device may employ a vertical semiconductor light emitting device of a Passive Matrix (PM) type.

The display device includes a substrate 210, a first electrode 220, a conductive adhesive layer 230, a second electrode 240 and at least one semiconductor light emitting element 250.

The substrate 210 is a wiring substrate on which the first electrode 220 is disposed and may contain polyimide (PI) to implement a flexible display device. Besides, the substrate 210 may use any substance that is insulating and flexible.

The first electrode 210 is located on the substrate 210 and may be formed as a bar type electrode that is long in one direction. The first electrode 220 may be configured to play a role as a data electrode.

The conductive adhesive layer 230 is formed on the substrate 210 where the first electrode 220 is located. Like a display device to which a light emitting device of a flip chip type is applied, the conductive adhesive layer 230 may include one of an Anisotropic Conductive Film (ACF), an anisotropic conductive paste, a conductive particle contained solution and the like. Yet, in the present embodiment, a case of implementing the conductive adhesive layer 230 with the anisotropic conductive film is exemplified.

After the conductive adhesive layer has been placed in the state that the first electrode 220 is located on the substrate 210, if the semiconductor light emitting element 250 is connected by applying heat and pressure thereto, the semiconductor light emitting element 250 is electrically connected to the first electrode 220. In doing so, the semiconductor light emitting element 250 is preferably disposed to be located on the first electrode 220.

If heat and pressure is applied to an anisotropic conductive film, as described above, since the anisotropic conductive film has conductivity partially in a thickness direction, the electrical connection is established. Therefore, the anisotropic conductive film is partitioned into a conductive portion and a non-conductive portion.

Furthermore, since the anisotropic conductive film contains an adhesive component, the conductive adhesive layer 230 implements mechanical coupling between the semiconductor light emitting element 250 and the first electrode 220 as well as mechanical connection.

Thus, the semiconductor light emitting element 250 is located on the conductive adhesive layer 230, via which an individual pixel is configured in the display device. As the semiconductor light emitting element 250 has excellent luminance, an individual unit pixel may be configured in small size as well. Regarding a size of the individual semiconductor light emitting element 250, a length of one side may be equal to or smaller than 80 μm for example and the individual semiconductor light emitting element 250 may include a rectangular or square element. For example, the rectangular element may have a size equal to or smaller than 20 μm×80 μm.

The semiconductor light emitting element 250 may have a vertical structure.

Among the vertical type semiconductor light emitting elements, a plurality of second electrodes 240 respectively and electrically connected to the vertical type semiconductor light emitting elements 250 are located in a manner of being disposed in a direction crossing with a length direction of the first electrode 220.

Referring to FIG. 9, the vertical type semiconductor light emitting element 250 includes a p-type electrode 256, a p-type semiconductor layer 255 formed on the p-type electrode 256, an active layer 254 formed on the p-type semiconductor layer 255, an n-type semiconductor layer 253 formed on the active layer 254, and an n-type electrode 252 formed on then-type semiconductor layer 253. In this case, the p-type electrode 256 located on a bottom side may be electrically connected to the first electrode 220 by the conductive adhesive layer 230, and the n-type electrode 252 located on a top side may be electrically connected to a second electrode 240 described later. Since such a vertical type semiconductor light emitting element 250 can dispose the electrodes at top and bottom, it is considerably advantageous in reducing a chip size.

Referring to FIG. 8 again, a phosphor layer 280 may formed on one side of the semiconductor light emitting element 250. For example, the semiconductor light emitting element 250 may include a blue semiconductor light emitting element 251 emitting blue (B) light, and a phosphor layer 280 for converting the blue (B) light into a color of a unit pixel may be provided. In this regard, the phosphor layer 280 may include a red phosphor 281 and a green phosphor 282 configuring an individual pixel.

Namely, at a location of configuring a red unit pixel, the red phosphor 281 capable of converting blue light into red (R) light may be stacked on a blue semiconductor light emitting element. At a location of configuring a green unit pixel, the green phosphor 282 capable of converting blue light into green (G) light may be stacked on the blue semiconductor light emitting element. Moreover, the blue semiconductor light emitting element may be singly usable for a portion that configures a blue unit pixel. In this case, the unit pixels of red (R), green (G) and blue (B) may configure a single pixel.

Yet, the present disclosure is non-limited by the above description. In a display device to which a light emitting element of a flip chip type is applied, as described above, a different structure for implementing blue, red and green may be applicable.

Regarding the present embodiment again, the second electrode 240 is located between the semiconductor light emitting elements 250 and connected to the semiconductor light emitting elements electrically. For example, the semiconductor light emitting elements 250 are disposed in a plurality of columns, and the second electrode 240 may be located between the columns of the semiconductor light emitting elements 250.

Since a distance between the semiconductor light emitting elements 250 configuring the individual pixel is sufficiently long, the second electrode 240 may be located between the semiconductor light emitting elements 250.

The second electrode 240 may be formed as an electrode of a bar type that is long in one direction and disposed in a direction vertical to the first electrode.

In addition, the second electrode 240 and the semiconductor light emitting element 250 may be electrically connected to each other by a connecting electrode protruding from the second electrode 240. Particularly, the connecting electrode may include an n-type electrode of the semiconductor light emitting element 250. For example, the n-type electrode is formed as an ohmic electrode for ohmic contact, and the second electrode covers at least one portion of the ohmic electrode by printing or deposition. Thus, the second electrode 240 and the n-type electrode of the semiconductor light emitting element 250 may be electrically connected to each other.

Referring to FIG. 8 again, the second electrode 240 may be located on the conductive adhesive layer 230. In some cases, a transparent insulating layer (not shown) containing silicon oxide ($SiO_x$) and the like may be formed on the substrate 210 having the semiconductor light emitting element 250 formed thereon. If the second electrode 240 is placed after the transparent insulating layer has been formed, the second electrode 240 is located on the transparent insulating layer. Alternatively, the second electrode 240 may be formed in a manner of being spaced apart from the conductive adhesive layer 230 or the transparent insulating layer.

If a transparent electrode of Indium Tin Oxide (ITO) or the like is used to place the second electrode 240 on the semiconductor light emitting element 250, there is a problem that ITO substance has poor adhesiveness to an n-type semiconductor layer. Therefore, according to the present disclosure, as the second electrode 240 is placed between the semiconductor light emitting elements 250, it is advantageous in that a transparent electrode of ITO is not used. Thus, light extraction efficiency can be improved using a conductive substance having good adhesiveness to an n-type semiconductor layer as a horizontal electrode without restriction on transparent substance selection.

Referring to FIG. 8 again, a partition 290 may be located between the semiconductor light emitting elements 250. Namely, in order to isolate the semiconductor light emitting element 250 configuring the individual pixel, the partition 290 may be disposed between the vertical type semiconductor light emitting elements 250. In this case, the partition 290 may play a role in separating the individual unit pixels from each other and be formed with the conductive adhesive layer 230 as an integral part. For example, by inserting the semiconductor light emitting element 250 in an anisotropic conductive film, a base member of the anisotropic conductive film may form the partition.

In addition, if the base member of the anisotropic conductive film is black, the partition 290 may have reflective property as well as a contrast ratio may be increased, without a separate block insulator.

For another example, a reflective partition may be separately provided as the partition 190. The partition 290 may include a black or white insulator depending on the purpose of the display device.

In case that the second electrode 240 is located right onto the conductive adhesive layer 230 between the semiconductor light emitting elements 250, the partition 290 may be located between the vertical type semiconductor light emitting element 250 and the second electrode 240 each. Therefore, an individual unit pixel may be configured using the semiconductor light emitting element 250. Since a distance between the semiconductor light emitting elements 250 is sufficiently long, the second electrode 240 can be placed between the semiconductor light emitting elements 250. And, it may bring an effect of implementing a flexible display device having HD image quality.

In addition, as shown in FIG. 8, a black matrix 291 may be disposed between the respective phosphors for the contrast ratio improvement. Namely, the black matrix 291 may improve the contrast between light and shade.

Hereinafter, a new design method for removing a via hole from a driving module of a display device according to one embodiment of the present disclosure will be described from FIG. 10. A display device to be described below is applicable to various products (e.g., TV, mobile phone, smartwatch, etc.) consisting of semiconductor light emitting elements, LEDs, and micro LEDs described above.

A driving module included in a display device according to one embodiment of the present invention will be described with reference to FIG. 10 and FIG. 11.

Figure 10:
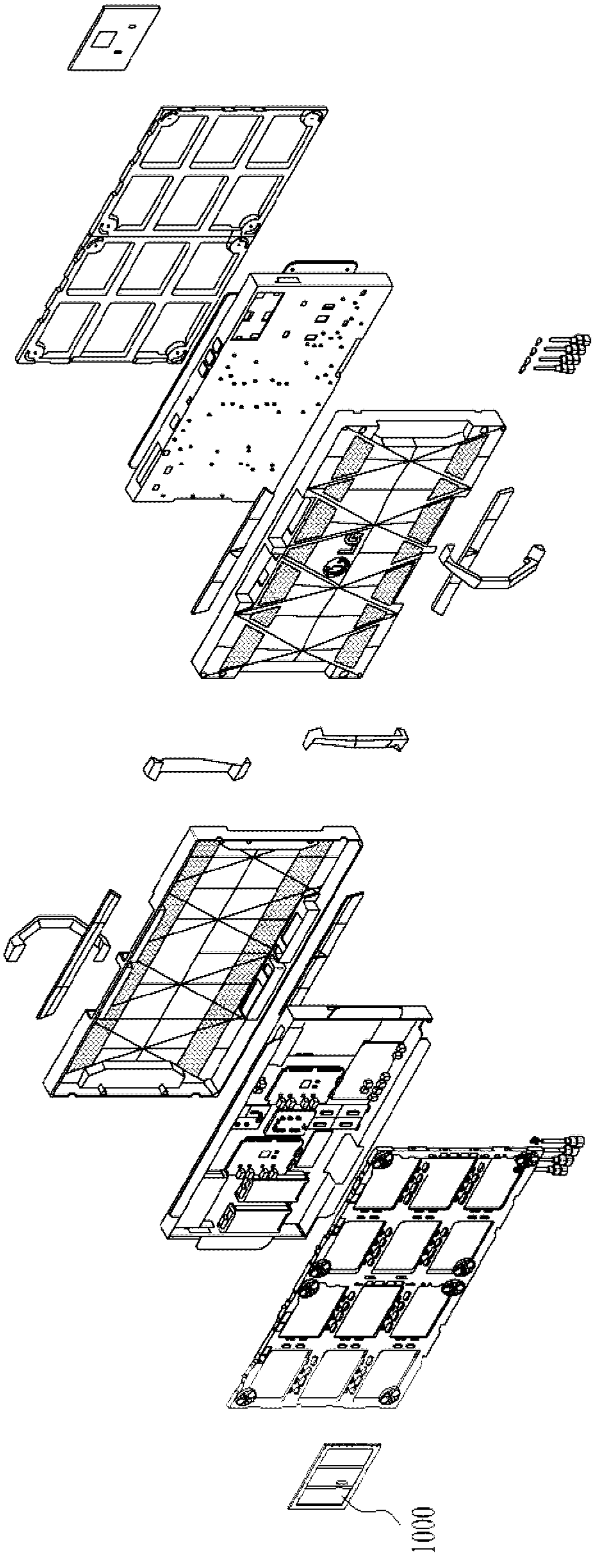
FIG. 10 is an exploded perspective diagram illustrating a housing structure of a display device according to embodiments.

FIG. 10 is an exploded perspective diagram illustrating a housing structure of a display device according to embodiments. FIG. 11 is a diagram illustrating an assembly process of a display device according to embodiments.

A driving module 1000 mounted inside a display device according to embodiments may control pixels for displaying a screen on a display. The driving module 1000 may include a driver IC that transmits a screen-related signal to a pixel and a scan IC that controls on/off of the pixel. The driver IC may apply a screen signal to the pixel using first to fourth signals different from each other. The scan IC may turn on/off the pixel using a scan signal. The scan signal may have a voltage and/or current value relatively higher than that of a driver signal.

The first to third signals according to embodiments may be clock signals. The clock signals may be signals related to information to be displayed on the screen. In this case, the first signal may be, for example, a data clock signal, the second signal may be, for example, a grayscale clock signal, and the third signal may be, for example, a latch clock signal. In addition, the fourth signal may be, for example, a data signal.

The first to fourth signals according to embodiments may be transmitted by a driver circuit. The driver circuit may include a first circuit for transmitting the first signal, a second circuit for transmitting the second signal, a third circuit for transmitting the third signal, and a fourth circuit for transmitting the fourth signal.

The fourth circuit for transmitting the data signal may include a plurality of sub-circuits. One sub-circuit may connect two driver ICs, respectively.

A display device according to embodiments may include a driving module 1000 for controlling a pixel. The driving module 1000 may include a PCB including a plurality of layers on which a circuit is printed, and may include a plurality of driver ICs and scan ICs attached to the PCB to transmit at least one signal. In addition, the driving module 1000 may include a driver circuit that connects the driver ICs to each other in a first direction D1, and may include a scan circuit that connects scan ICs to each other in the first direction D1. In this case, the driver circuit and the scan circuit may not cross each other. The driving module 1000 may include a controller that controls at least one of a plurality of the driver ICs, the scan ICs, a driver circuit, and a scan circuit.

Figure 11:
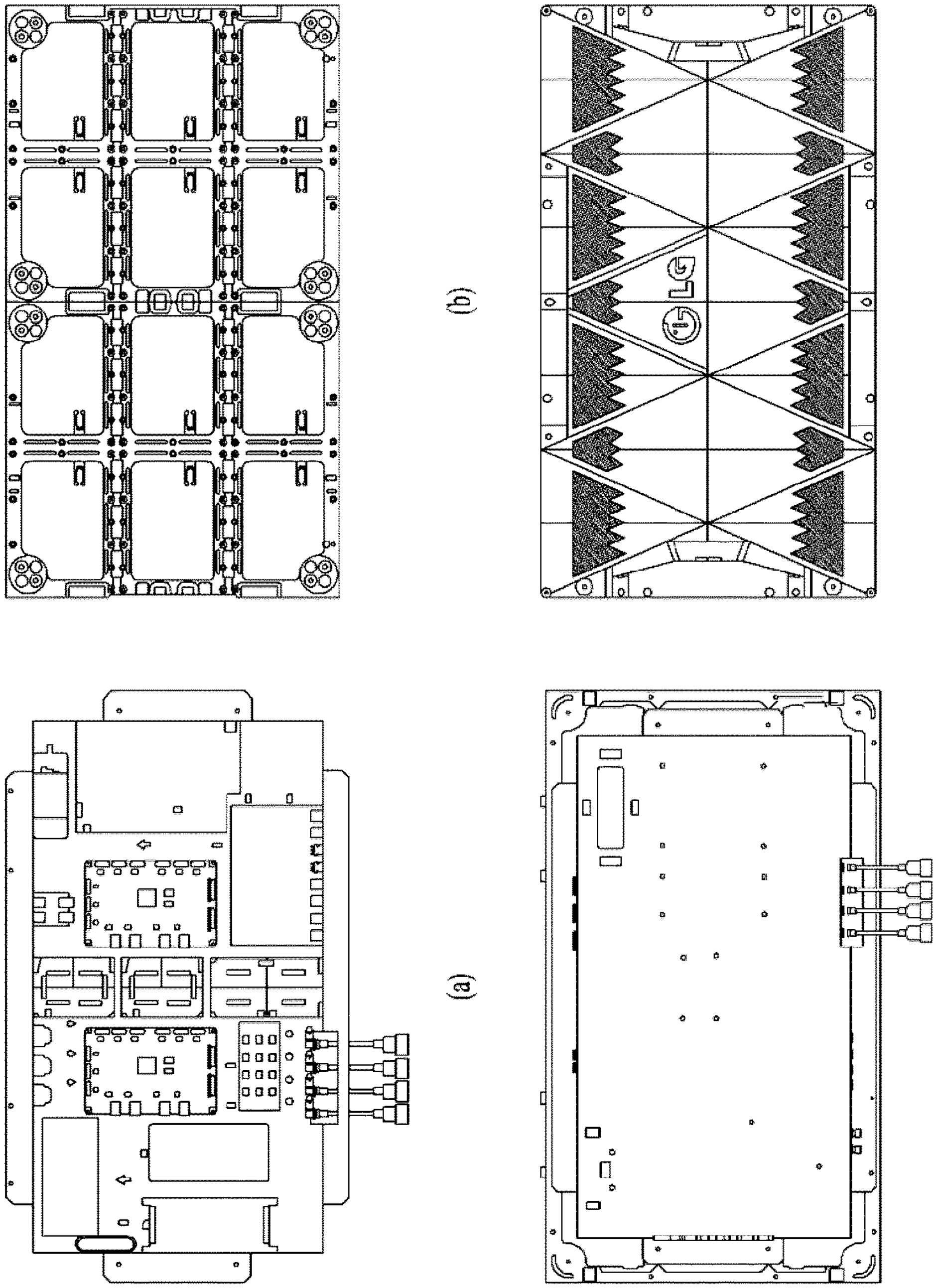
FIG. 11 is a diagram illustrating an assembly process of a display device according to embodiments.

FIG. 11 illustrates an assembly procedure of a display device according to embodiments of the present disclosure. Specifically, FIG. 11(*a*) is a front diagram of a body on which electronic components of the display device are mounted, viewed from one side. FIG. 11(*b*) is a front diagram of a display frame supporting a display panel. FIG. 11(*c*) is a front diagram of the body and display panel coupled together. FIG. 11(*d*) is a diagram of a case assembled to have the body and display frame provided therein.

Figure 12:
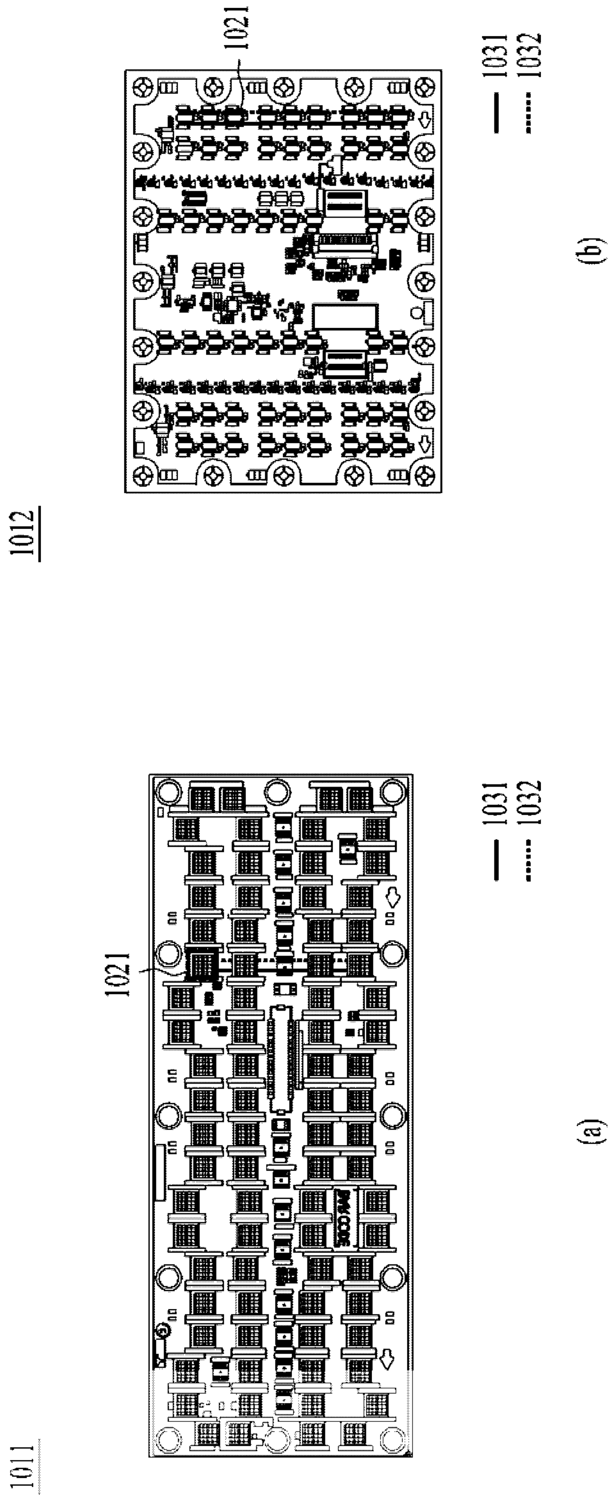
FIG. 12 is a diagram illustrating one side of a driving module according to embodiments.

FIG. 12 is a diagram illustrating one side of a driving module according to embodiments.

Specifically, FIG. 12 is a front diagram showing the driving module 1000 of the display device according to various embodiments. FIG. 12(*a*) illustrates a driving module 1011 using a driver IC 1021 and/or a scan IC 1022 of a BGA type. FIG. 12(*b*) illustrates a driving module 1012 using a driver IC 1021 and/or a scan IC of an SOP type.

FIG. 12(*a*) shows a driving module 1011 including an IC of a Ball Grid Array type (hereinafter referred to as a BGA type). As circuits are printed on a PCB 2001 under an area where the ICs are placed, the ICs are connected to each other.

FIG. 12(*b*) sows a driving module 1012 including an IC of a Small Outline Package type (hereinafter referred to as an SOP type). As pins protruding from a side of the IC are in contact with wires, whereby ICs are connected to each other. In addition, FIG. 12 shows that a driver circuit 1031 and/or a scan circuit 1032 are printed on a surface of a PCB 2001 to connect the ICs to each other.

Figure 13:
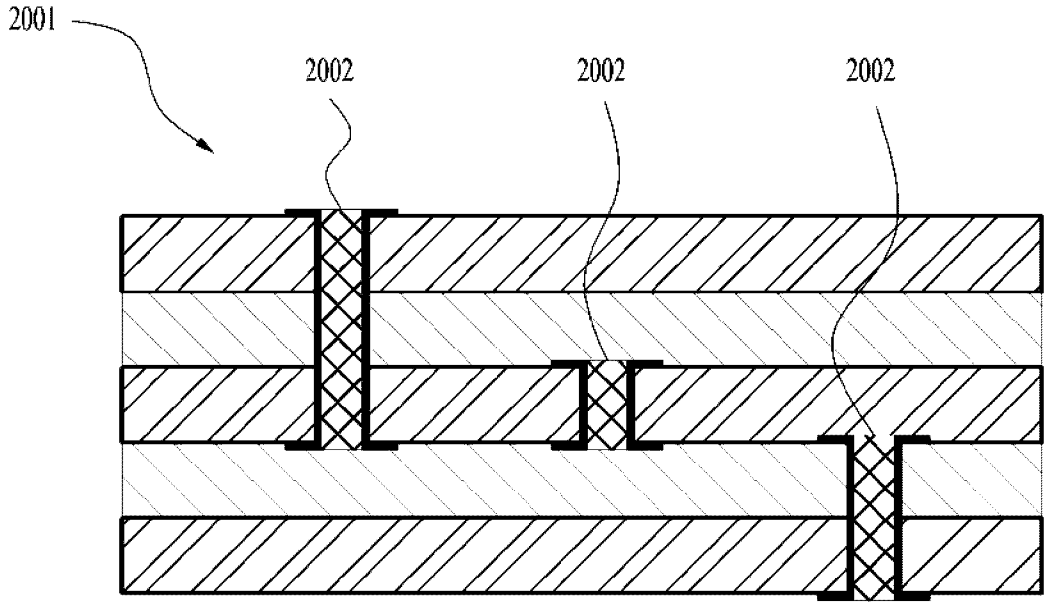
FIG. 13 is a cross-sectional diagram to describe a structure of a multi-layered PCB according to a related art.

Hereinafter, a structure of the PCB 2001 included in the driving module 1000 of the existing display device will be described. FIG. 13 is a cross-sectional diagram to describe a structure of a multi-layered PCB 2001 according to a related art.

A driving module 1000 should be equipped with a driver IC and a scan IC, and include a PCB 2001 substrate to electrically connect the ICs to each other and supply power thereto. The PCB 2001 is an abbreviation for a printed circuit board, and because of a method of forming wiring through screen printing, a term containing the word 'print' has been used.

The PCB 2001 generally has a single-sided, double-sided, multi-layered structure, and copper is generally used as an interconnection medium between layers. Substrates of different layers may be interlayer-connected using via holes 2002. Yet, when high current flows vertically through the via hole 2002, unnecessary electromagnetic waves are emitted, and the generated electromagnetic waves may be propagated throughout the whole PCB package through a resonance mode of parallel conductor plates (hereinafter referred to as Electromagnetic Interference (EMI)). The EMI may generate noise in a signal flowing through a circuit.

If it is able to cancel the noise of the signal transmitted to a pixel through the driver IC, a clearer screen may be obtained. According to embodiments, when the conductive wire arrangement that does not require the via hole 2002 is used, EMI may be reduced and noise may be decreased. In addition, the circuit wiring design from which the via hole 2002 is removed may lower the difficulty in fabricating the PCB 2001. Additionally, the driving module from which the via hole 2002 is removed may have an advantage of power consumption.

Since a scan signal in a display driving module is a signal for controlling on/off by applying power to an LED, voltage and/or current values may be greater than those of clock signals. When a scan circuit for transmitting a scan signal is disposed through the via hole 2002, EMI emission becomes relatively very large. Therefore, a design method of disposing a scan circuit through the via hole 2002 is not used.

Therefore, it is a common method to design a circuit by forming a via hole 2002 in a driver circuit wiring with a relatively low applied voltage and a relatively small flowing current. When the driver circuit intersects the scan circuit, a design method of bypassing the driver circuit to another layer by forming a via hole 2002 at a corresponding intersection 1050 has been commonly used.

For example, when crossing between conductive wires occurs in a specific layer of a PCB substrate having a multi-layered structure, a via hole 2002 is used to bypass it. However, the conductive wire passing through the via hole 2002 is disposed vertically from the specific layer to another, thereby causing ElectroMagnetic Interference (EMI) and inter-signal noise in relation to other conductive wires.

In addition, there is also a problem in that the difficulty in fabricating the PCB increases when the via hole 2002 is formed.

Figure 14:
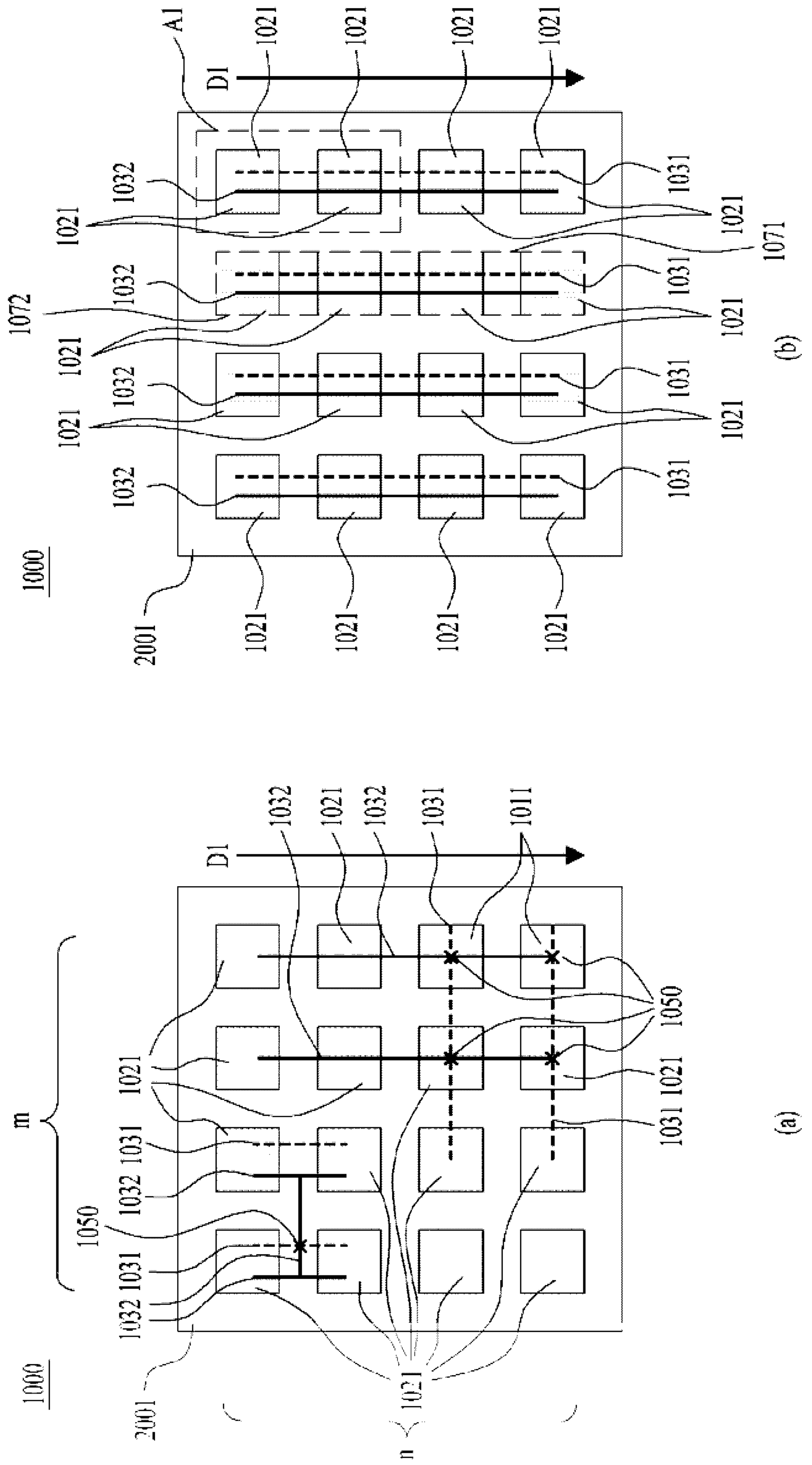
FIG. 14 is a layout illustrating an IC arrangement of a driving module according to embodiments.

FIG. 14 is a layout illustrating an IC arrangement of a driving module according to embodiments.

Figure 15:
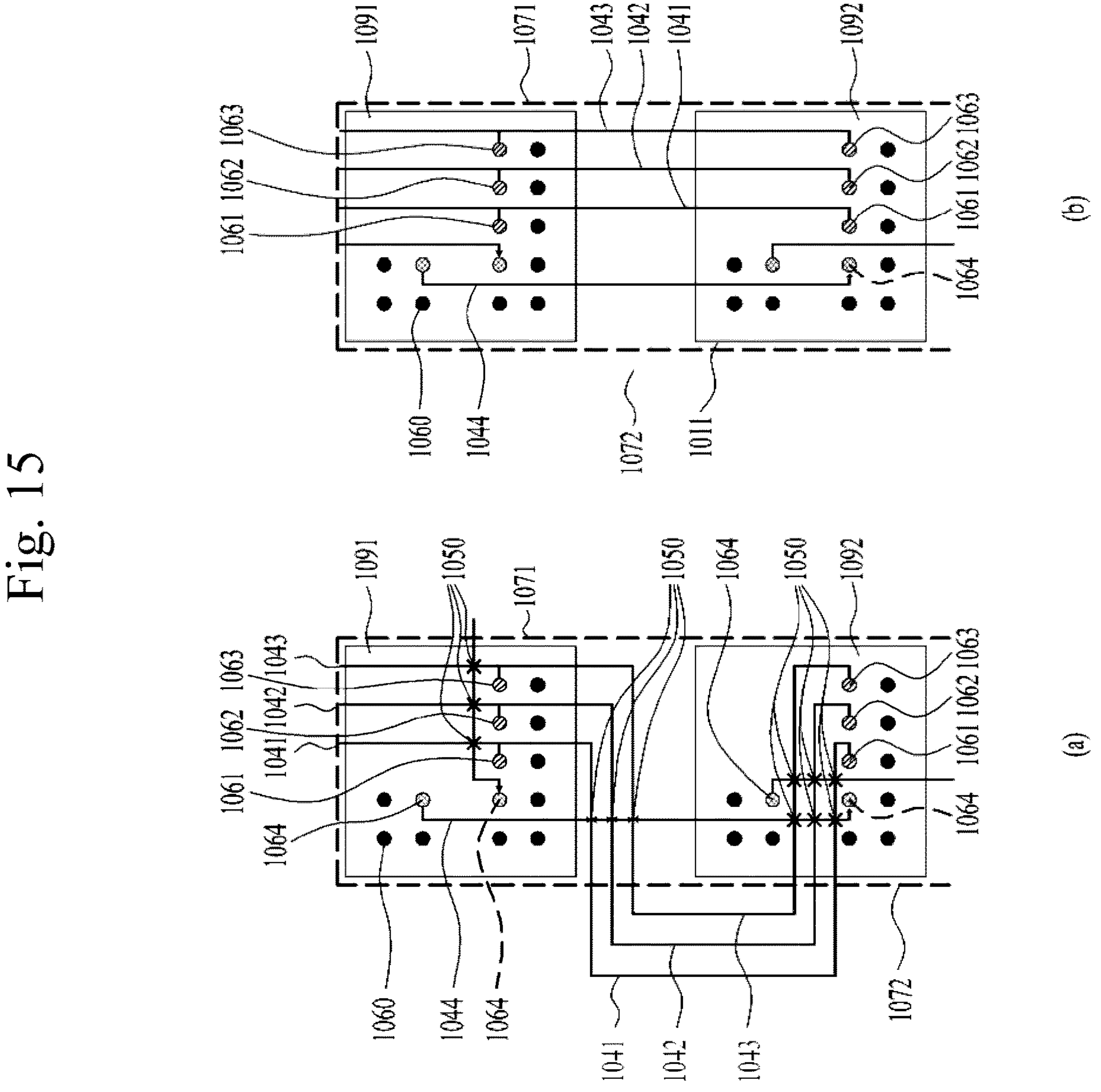
FIG. 15 is a layout illustrating an enlarged part A1 of FIG. 14.

FIG. 15 is a layout illustrating an enlarged part A1 of FIG. 14.

Figure 16:
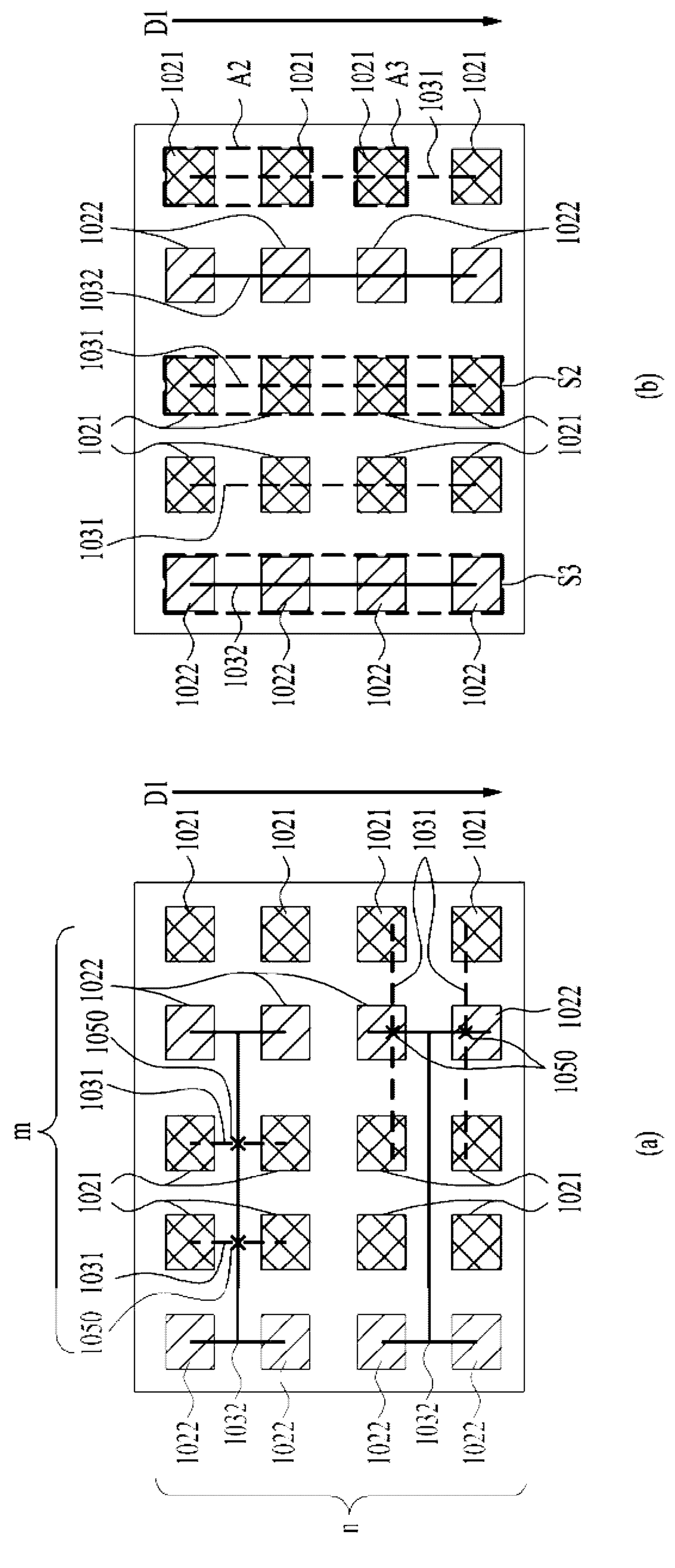
FIG. 16 is a layout illustrating an IC arrangement of a driving module included in a display device according to other embodiments.

FIG. 16 is a layout illustrating an IC arrangement of a driving module included in a display device according to other embodiments.

Figure 17:
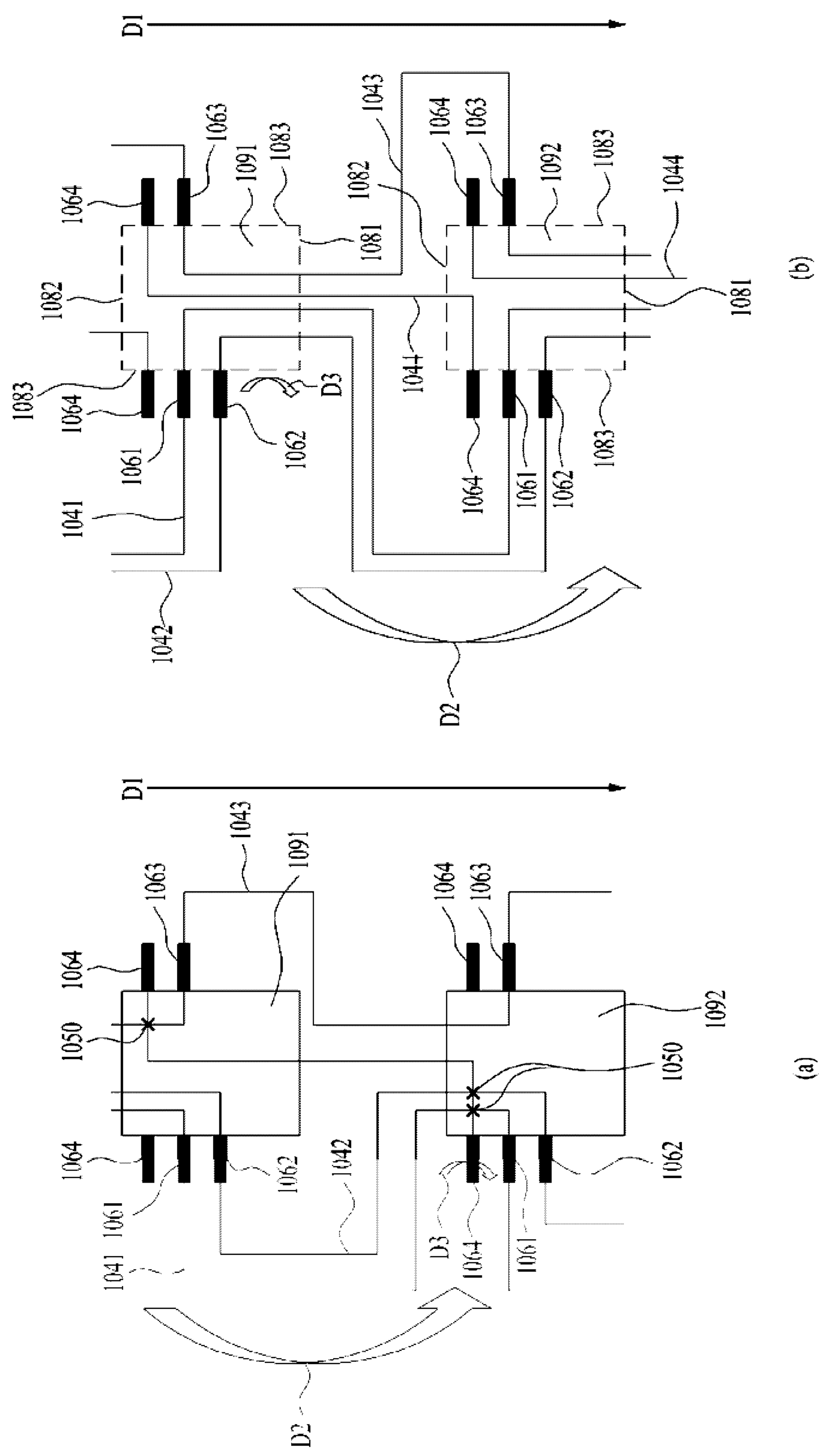
FIG. 17 is a layout illustrating an enlarged part A2 of FIG. 14.

FIG. 17 is a layout illustrating an enlarged part A2 of FIG. 14.

Figure 18:
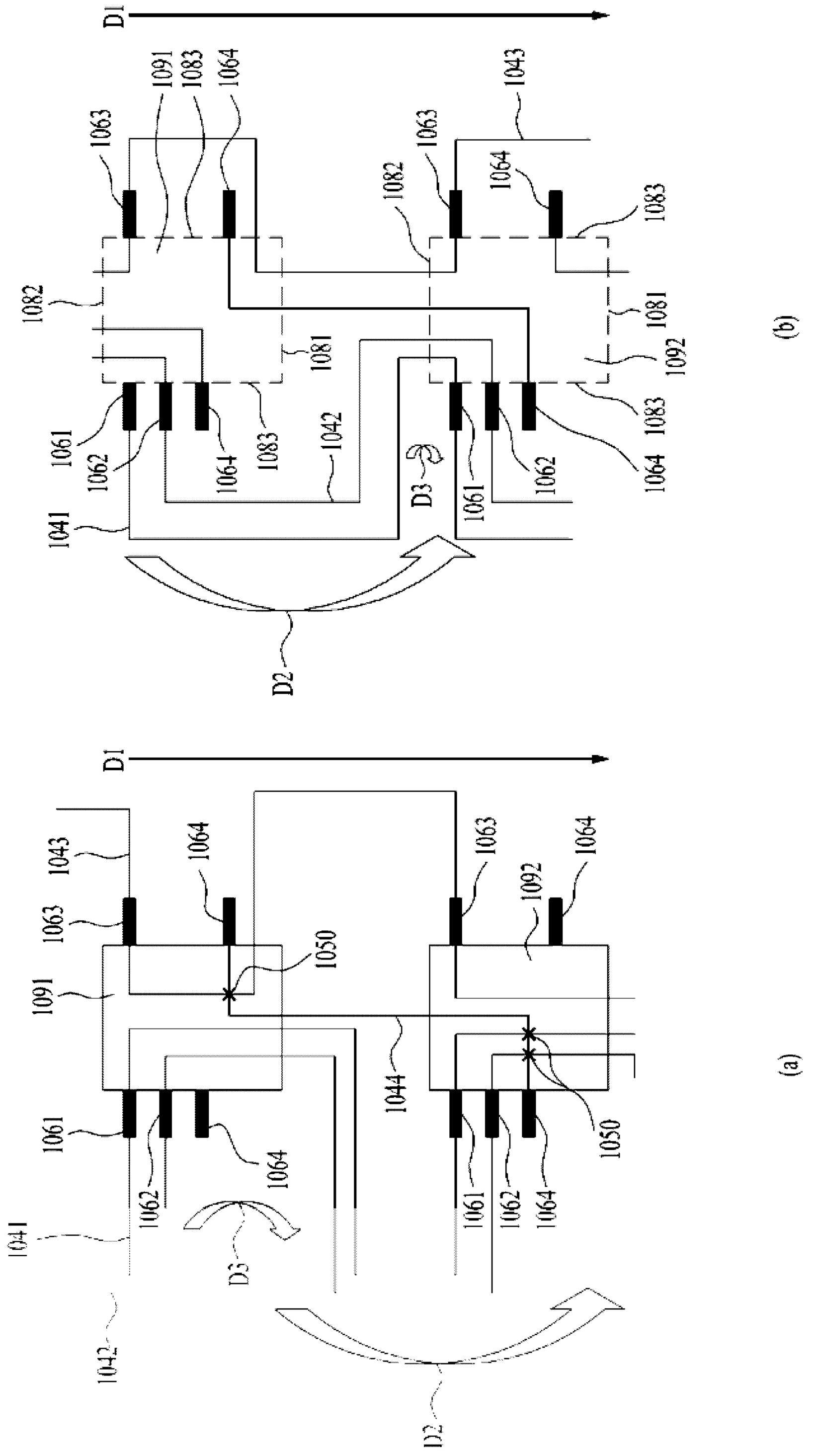
FIG. 18 is a layout of another embodiment in which a part A2 of FIG. 14 is enlarged.

FIG. 18 is a layout of another embodiment in which a part A2 of FIG. 14 is enlarged.

Hereinafter, a driving module 1000 of a display device in which driver ICs 1021 and scan ICs 1022 are disposed in parallel according to one embodiment of the present disclosure will be described with reference to FIGS. 14 to 18.

FIG. 14 and FIG. 15 are presented to describe a structure for disposing a driver circuit 1031 and a scan circuit 1032 without using a via hole in a driving module 1000 using a type of a driver IC 1021 having a scan IC 1022 built inside according to embodiments.

FIGS. 16 to 18 are presented to describe a structure for disposing a driver circuit 1031 and a scan circuit 1032 without using a via hole in a driving module 1000 using a type of a driver IC 1021 having a scan IC 1022 built inside according to other embodiments.

Specifically, the circuit structure presented in FIG. 14 and FIG. 15 is a technology mainly used for a BGA-type IC having a pin 1060 provided between areas where an IC is placed on a PCB 2001. This may connect a conductive wire and the pin 1060 together under an attachment surface of the IC.

On the other hand, the circuit structure presented in FIGS. 16 to 18 is a technology mainly used in an SOP-type IC having a pin 1060 provided on a side of an area where an IC is placed on a PCB 2001. Unlike the BGA-type IC, a conductive wire and the pin 1060 cannot be connected under an attachment surface of the IC. Therefore, when using an SOP-type IC, a circuit arrangement structure using a method different from a case of using a BGA-type IC is required.

Driver ICs 1021 disposed in parallel may be connected in a first direction D1 through a driver circuit 1031, and scan ICs 1022 disposed in parallel may be connected in the first direction D1 through a scan circuit 1032. In addition, by disposing both the driver circuit 1031 and the scan circuit 1032 in parallel in the first direction D1, it is possible to remove an intersection 1050 where inter-circuit crossing occurs. However, the meaning of 'parallel' here is not limited only to the case where it is completely 180 degrees.

Additionally, embodiments present a wire arrangement in which first to fourth circuits 1041 to 1044 included in the driver circuit 1031 may connect the driver ICs 1021 in parallel without crossing each other.

Hereinafter, a driving module 1000 of a display using a driver IC 1021 having a scan IC 1022 built inside will be described with reference to FIG. 14 and FIG. 15.

FIG. 14(*a*) illustrates a connection structure between ICs of a driving module 1000 according to a related art. FIG. 14(*b*) illustrates a structure of a driving module 1000 including a driver IC 1021 having a scan IC 1022 built inside according to embodiments.

In most cases, an IC connection structure of an existing driving module 1000 has no choice but to form a via hole 2002 as an intersection 1050 occurs between a scan circuit 1032 and a driver circuit 1031.

A driving module 1000 of a display device according to embodiments may include a driver IC 1021 having a scan IC 1022 built inside. Such a driver IC 1021 of the scan IC built-in type may be an IC of a BGA type.

Specifically, the BGA-type driver IC 1021 may include a plurality of pins 1060 on a surface where the IC is attached onto a PCB 2001. In addition, a circuit is printed over an area where the driver IC 1021 is located on the PCB 2001, so that the pin 1060 included in the driver IC 1021 may be connected to each other.

The driving module 1000 according to embodiments may include a driver circuit 1031 and/or a scan circuit 1032 placed in a first direction D1. The drivers IC 1021 may be disposed on the PCB 2001 in a form having n rows and m columns. In this case, the first direction D1 may be a column direction and/or a vertical direction. The driver circuit 1031 and/or the scan circuit 1032 may be disposed parallel to each other in the first direction D1 to connect n driver ICs 1021 to each other. Since the driver IC 1021 having n rows is disposed in m rows in a horizontal direction, the m driver circuits 1031 and/or scan circuits 1032 may connect all n×m driver ICs 1021 together and transmit first to fourth signals and a scan signal. By utilizing the circuit arrangement according to the embodiments, the driver ICs 1021 may be connected without generating an intersection 1050 between the driver circuit 1031 and the scan circuit 1032.

An area of one column in which n driver ICs 1021 are disposed in the first direction D1 may be referred to as an area S1. It may be confirmed that n driver ICs 1021 placed in parallel, the driver circuit 1031, and the scan circuit 1032 are located only inside the area S1, and that there is no intersection 1050 with a circuit connecting ICs in another column. Therefore, using the circuit arrangement structure according to the embodiment, it is possible to design a driver circuit 1031 and/or a scan circuit 1032 without including a via hole 2001.

FIG. 15 is an enlarged diagram of the driver ICs 1021 and the driver circuit 1031 in an area A1 of FIG. 14B. For convenience of description, the scan circuit 1032 in the area A1 is not shown.

A bottom surface of the driver IC 1021 according to embodiments may include a pin PIN 1060 to which a different type of a circuit is connected. For example, regarding the types of pins, there are a first pin 1061 to which a first circuit 1041 is connected, a second pin 1062 to which a second circuit 1042 is connected, a third pin 1063 to which a third circuit 1043 is connected, or a fourth pin 1064 to which a fourth circuit 1044 is connected. The circuit printed on one surface of the PCB 2001 may be connected to the pin 1060 suitable for each type to transmit one of the first to fourth signals.

The first driver IC 1091 and the second driver IC 1092 may be positioned inside the area A1. The first to fourth circuits 1041 to 1044 may connect the first driver IC 1091 and the second driver IC 1092 to each other.

FIG. 15(*a*) shows a method of connecting the first driver IC 1091 and the second driver IC 1092 to each other through the driver circuit 1031 according to the existing design method. According to the existing design method, a plurality of intersections 1050 occur where the first circuit 1041 to the third circuit 1043 overlap with the fourth circuit 1044. According to the existing method, at least 12 intersections 1050 may occur inside the area A1.

FIG. 15(*b*) illustrates a method of connecting the first driver IC 1091 and the second driver IC 1092 to each other by disposing the driver circuit 1031 according to embodiments. The first circuit 1041 to the fourth circuit 1044 may be disposed parallel to each other and connected to the first pin 1061 to the fourth pin 1064, respectively.

Specifically, the first to fourth circuits 1041 to 1044 according to the embodiments may be disposed side by side in the first direction D1 within the area S1 and may be parallel to each other. The first circuit 1041 to the fourth circuit 1044 may be connected to the first pin 1061 to the fourth pin 1064 included in a plurality of the driver ICs 1021, respectively, to connect the driver ICs 1021 in the first direction D1.

The fourth circuit 1044 according to the embodiments may include a plurality of sub-circuits. In connecting the first driver IC 1091 and the second driver IC 1092 together, one end of the sub-circuit may be connected to the fourth pin 1064 of the first driver IC 1091, and the other end of the sub-circuit may be connected to the fourth pin 1064 of the second driver IC 1092. In this case, the sub-circuit may be disposed so that a pattern in a direction different from the first direction D1 exists twice or less when connecting the two driver ICs 1021. That is, in connecting the two driver ICs 1021, each sub-circuit may be disposed such that two or less bent points exist.

The area A1 may be an area in which the first driver IC 1091 and the second driver IC 1092 are connected to each other on the PCB 2001. The area A1 may have a rectangular shape, and may include a first boundary 1071 and a second boundary 1072 parallel to the first direction D1. The first circuit 1041 to the fourth circuit 1044 according to the embodiments may exist only within the area A1, and the first circuit 1041 to the fourth circuit 1044 according to the embodiments may exist only between the first boundary 1071 and the second boundary 1072.

According to the embodiments shown in FIG. 14(*b*) and FIG. 15(*b*), a conductive wire arrangement without occurrence of an intersection 1050 between the driver circuit 1031 and the scan circuit 1032 may be made, and the first to fourth circuits 1041 to 1044 included in the driver circuit 1031 may not form an intersection 1050 as well.

Hereinafter, a driving module 1000 of a display including a driver IC 1021 having a scan IC 1022 built outside will be described with reference to FIGS. 16 and 18.

FIG. 16(*a*) illustrates a connection structure between ICs of a driving module 1000 according to an existing design method. FIG. 16(*b*) shows an IC-to-IC connection structure of a driving module 1000 including a type of a driver IC 1021 having a scan IC 1022 built outside according to embodiments.

The driving module 1000 of the display device according to embodiments may include a driver IC 1021 and/or a scan IC 1022 of an SOP type.

According to embodiments, the driver IC 1021 and/or the scan IC 1022 of the SOP type may include a plurality of pins 1060 on a side surface thereof. In addition, a conductive wire may be printed on a lateral side and/or under a bottom side of an area where the IC is located on a PCB 2001. The pin 1060 and the conductive wire included in the driver IC 1021 and/or the scan IC 1022 may be connected to each other.

The driving module 1000 according to the embodiments may include a driver circuit 1031 and/or a scan circuit 1032 placed in a first direction D1. The driver IC 1021 and/or the scan IC 1022 may be disposed on the PCB 2001 while intersecting in a form having n rows and m columns. In this case, the first direction D1 may be a column direction and/or a vertical direction. The driver circuit 1031 and/or the scan circuit 1032 may be disposed in parallel in the first direction D1 to connect n ICs to each other. The ICs with n rows are disposed to form m columns toward the row direction. The m driver circuits 1031 and/or scan circuits 1032 may connect all n×m driver ICs 1021 and transmit first to fourth signals and scan signals. By utilizing the arrangement according to embodiments, the ICs may be connected without generating an intersection 1050 between the driver circuit 1031 and the scan circuit 1032.

The n driver ICs 1021 and the driver circuit 1031 placed in parallel may be located only inside an area S2. In addition, the n scan ICs 1022 and the scan circuit 1032 placed in parallel may be located only inside an area S3. There may exist a plurality of the areas S2 and a plurality of the areas S3. It may be seen that each circuit does not form an intersection 1050 with a circuit that connects ICs in a different column.

FIG. 17 and FIG. 18 are enlarged diagrams specifically showing the driver IC 1021 and the driver circuit 1031 of the area A2 in FIG. 16(*b*).

FIG. 17(*a*) and FIG. 18(*a*) show the structures in which the first driver IC 1091 and the second driver IC 1092 are connected to each other using the driver circuit 1031 according to the existing design method. According to the existing design method, the first circuit 1041 to the third circuit 1043 form intersections 1050 with the fourth circuit 1044. This may generate at least three intersections 1050 inside the area A2.

A side surface of the driver IC 1021 according to embodiments may include a pin PIN 1060 to which a different type of a circuit is connected. The type of the pin 1060 may be one of a first pin 1061 to which the first circuit 1041 is connected, a second pin 1062 to which the second circuit 1042 is connected, a third pin 1063 to which the third circuit 1043 is connected, and a fourth pin 1064 to which the fourth circuit 1044 is connected. A circuit printed on one surface of the PCB 2001 may be connected to the pin 1060 suitable for each type to transmit one of the first to fourth signals.

The first pin 1061 to the third pin 1063 of the driver IC 1021 according to embodiments may be a pin 1060 related to a clock signal, and the fourth pin 1064 may be a pin 1060 related to a data signal. In addition, the first to third circuits 1041 to 1043 of the driver circuit 1031 according to embodiments may be clock signal circuits that transmit clock signals, and the fourth circuit 1044 may be a data signal circuit that transmits a data signals.

A first driver and a second driver may be positioned inside the area A2. The first circuit 1041 to the fourth circuit 1044 may connect the first driver and the second driver to each other.

According to embodiments, the first circuit 1041 to the fourth circuit 1044 located inside the area S2 may be connected to the first pins 1061 to the fourth pins 1064 included in a plurality of the driver ICs 1021, respectively. The driver ICs 1021 may be connected to each other in the first direction D1 by using the structure according to embodiments.

The fourth circuit 1044 according to embodiments may include a plurality of sub-circuits. In connecting the first driver IC 1091 and the second driver IC 1092 to each other, one end of the sub-circuit may be connected to the fourth pin 1064 of the first driver IC 1091, and the other end of the sub-circuit may be connected to the fourth pin 1064 of the second driver IC 1092.

An area A3 may be an area in which the driver IC 1021 is disposed on the PCB 2001. In addition, the area A3 may have a rectangular shape. The area A2, which is an area where two driver ICs 1021 are connected on the PCB 2001, may include two areas A3 therein.

Specifically, the area A3 may include four surfaces. The four surfaces included in the area A3 may correspond to four edges of the area A3.

In addition, one of the four surfaces included in the area A3 corresponding to the first driver IC 1091 inside the area A2 may be a first specific surface 1081, which is a surface facing the second driver IC 1092. In addition, one of the four surfaces included in the area A3 corresponding to the second driver IC 1092 may be a second specific surface 1082, which is a surface facing the first driver IC 1091. Among the surfaces of the area A3, a surface parallel to the first direction D1 may be a third specific surface 1083.

In the driving module 1000 of the display device according to embodiments, the first specific surface 1081 may be the closest surface to the area where the second driver IC 1092 is located. In addition, the second specific surface 1082 may be the closest surface to the area where the first driver IC 1091 is located. The first specific surface 1081 and the second specific surface 1082 may be parallel to each other. That is, the first specific surface 1081 and the second specific surface 1082 may correspond to the surfaces confronting each other among the four surfaces included in the two areas A3 included in the area A2. In addition, the first specific surface 1081 and the second specific surface 1082 may be the surfaces vertical to the first direction D1.

FIG. 17(*b*) illustrates a structure in which the driver circuit 1031 is disposed according to embodiments to connect the first driver IC 1091 and the second driver IC 1092 to each other.

The driving module 1000 of the display device according to embodiments may have a structure in which the pin 1060 related to the clock signal is located relatively closer to the first specific surface 1081 than the pin 1060 related to the data signal. In this case, a clock signal circuit may be disposed to cross the first specific surface 1081 while crossing with a surface different from the second specific surface 1082. Here, the surface different from the second specific surface 1082 may be the third specific surface 1083. The third specific surface 1083 may be a surface parallel to the first direction D1.

The driving module 1000 of the display device according to embodiments may be disposed in a manner that the clock signal circuit crosses the third specific surface 1083 and enters the area A3 when the pin 1060 related to the clock signal is located relatively closer to the first specific surface 1081 than the pin 1060 related to the data signal. In addition, the clock signal circuit entering the area A3 may be disposed to cross the first specific surface 1081 and leave the area A3.

If the pin 1060 related to the clock signal is located relatively closer to the first specific surface 1081 than the pin 1060 related to the data signal, the driving module 1000 of the display device according to embodiments may dispose the clock signal circuit to cross with the third specific surface 1083 along a counterclockwise direction D2 and also dispose the clocks signal circuit to cross with the first specific surface 1081 along a clockwise direction D3.

FIG. 18(*b*) illustrates a method of connecting the first driver IC 1091 and the second driver IC 1092 to each other by disposing the driver circuit 1031 according to other embodiments.

The driving module 1000 of the display device according to other embodiments may have a structure in which the pin 1060 related to the clock signal is located relatively farther from the first specific surface 1081 than the pin 1060 related to the data signal. In this case, the clock signal circuit may be disposed to cross with the first specific surface 1081 while crossing with a surface different from the second specific surface 1082. Here, the surface different from the second specific surface 1082 may be the third specific surface 1083. The third specific surface 1083 may be a surface parallel to the first direction D1.

The driving module 1000 of the display device according to other embodiments may be disposed so that the clock signal circuit crosses with the second specific surface 1082 and enters the area A3 when the pin 1060 related to the clock signal is located relatively farther from the first specific surface 1081 than the pin 1060 related to the data signal. In addition, the clock signal circuit entering the area A3 may be disposed to cross with the third specific surface 1083 and leave the area A3. In this case, the third circuit 1043 crossing with the third specific surface 1083 and leaving the area A3 may cross with the third specific surface 1083 again and then enter the area A3. The third circuit 1043 having entered the area A3 again may cross with the first specific surface 1081 and leave the area A3.

If the pin 1060 related to the clock signal is located relatively farther from the first specific surface 1081 than the pin 1060 related to the data signal, the driving module 1000 of the display device according to other embodiments may dispose the clock signal circuit to cross with the third specific surface 1083 along the counterclockwise direction D2 and also dispose the clock signal circuit to cross with the second specific surface 1082 along the clockwise direction D3.

If the pin 1060 related to the clock signal is located relatively farther from the first specific surface 1081 than the pin 1060 related to the data signal, the driving module 1000 of the display device according to other embodiments may dispose the clock signal circuit to cross with the third specific surface 1083 along the counterclockwise direction D2 and also dispose the clock signal circuit to cross with the second specific surface 1082 along the clockwise direction D3.

According to the embodiments of FIGS. 16(*b*), 17(*b*), and 18(*b*), conductive wire arrangement without intersections 1050 between the driver circuit 1031 and the scan circuit 1032 may be made, and the first to fourth circuits 1041 to 1044 included in the driver circuit 1031 may not form intersections 1050 with each other.

Specifically, according to the related art shown in FIG. 16(*a*), up to fifteen via holes 2002 may be formed with respect to the first circuit 1041 to the third circuit 1043 based on the pitch 1.25 mm model. In addition, up to six via holes 2002 may be formed with respect to the fourth circuit 1044.

On the other hand, based on FIG. 16(*b*) according to one embodiment of the present disclosure, there is a technical effect of reducing the number of the via holes 2002 to 0.

Specifically, according to the related art in FIG. 17(*a*) and FIG. 18(*a*), up to thirty-one via holes 2002 may be formed with respect to the first circuit 1041 to the third circuit 1043 based on the pitch 2.5 mm model. In addition, up to six via holes 2002 may be formed with respect to the fourth circuit 1044.

On the other hand, based on FIG. 17(*b*) or FIG. 18(*b*) according to one embodiment of the present disclosure, there is a technical effect of reducing the number of the via holes 2002 to 0.

Figure 19:
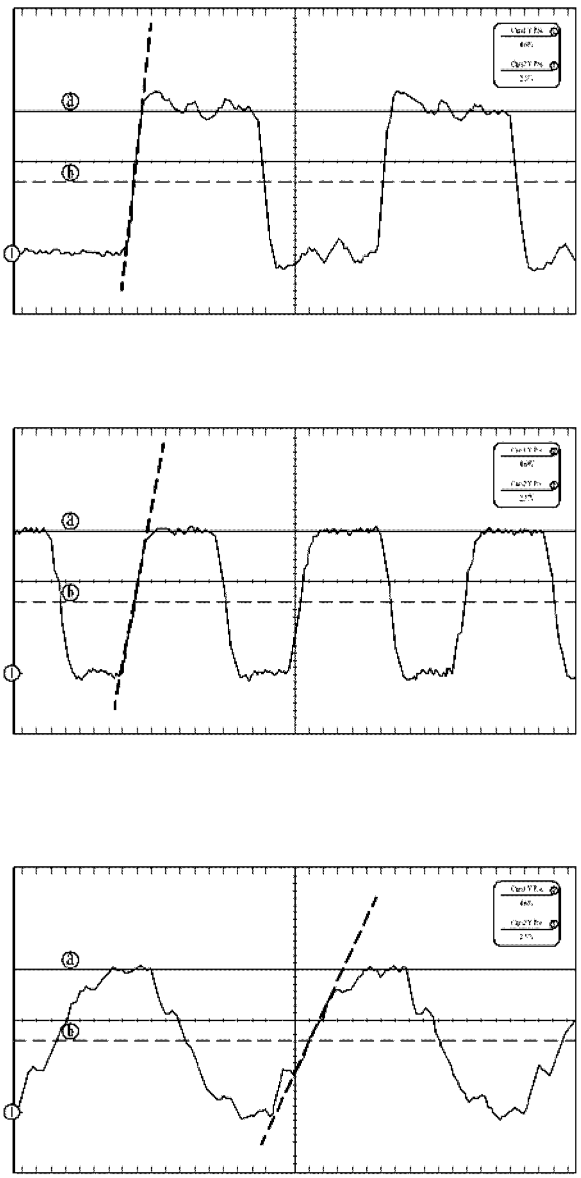
FIG. 19 is a graph illustrating a first signal result value for comparing the performance of a driving module according to embodiments with that of a driving module of a related art.
Figure 20:
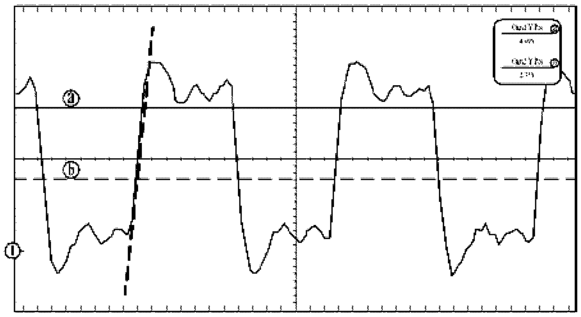
FIG. 20 is a graph illustrating a second signal result value for comparing the performance of a driving module according to embodiments with that of a driving module of a related art.
Figure 20:
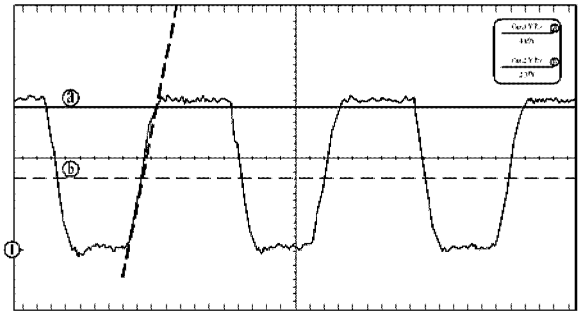
Figure 20:
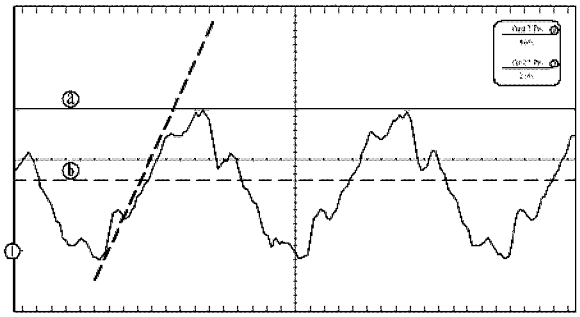

FIG. 19 to FIG. 20 are graphs illustrating effects of using the driving module 1000 of the display apparatus according to embodiments.

FIG. 19(*a*) shows the output waveform of a first signal applied from a Field-Programmable Gate Array controller (hereinafter referred to as FPGA controller) to the driving module 1000. FIG. 19(*b*) illustrates a waveform of a first signal at an input unit of the driver IC 1021 of the driving module 1000 that does not include the via hole 2002 by being designed through the method according to embodiments. FIG. 19(*c*) illustrates a waveform of a first signal at an input unit of the driver IC 1021 of the driving module 1000 including the via hole 2002.

FIG. 20(*a*) illustrates an output waveform of a second signal applied from the FPGA controller to the driving module 1000. FIG. 20(*b*) illustrates a waveform of the second signal at an input part of the driver IC 1021 of the driving module 1000 that does not include the via hole 2002 designed through the method according to the embodiments. FIG. 20(*c*) illustrates a waveform of the second signal at the input part of the driver IC 1021 of the driving module 1000 including the via hole 2002.

With respect to the FPGA Controller output waveform represented in FIG. 19(*a*), it can be observed that the input waveform in FIG. 19(*b*) has a much similar shape than the input waveform in FIG. 19(*c*). In addition, with respect to the FPGA Controller output waveform represented in FIG. 20(*a*), it can be observed that the input waveform in FIG. 20(*b*) is much similar than the input waveform in FIG. 20(*c*).

Namely, in the case of using the driving module 1000, from which the via holes 2002 are removed by the design method according to embodiments of the present disclosure, noise during signal transmission is reduced compared to the case of using the driving module including the via holes 2002 of the related art. In addition, compared to the related art, there is a technical effect in that signals generated from the IC better follow the output waveform applied from the FPGA controller.

The above description is merely illustrative of the technical spirit of the present disclosure. It will be apparent to those skilled in the art that various modifications and variations can be made in the present disclosure without departing from the spirit and scope of the disclosure.

Therefore, the embodiments disclosed in the present disclosure are merely illustrative of the technical spirit of the present disclosure. The scope of the technical spirit of the present disclosure is not limited by these embodiments. The scope of the present disclosure should be construed by the appended claims, and all technical ideas within the scope equivalent thereto should be construed as being within the scope of the present disclosure.

What is claimed is:

1. A display device, comprising:

a PCB including a plurality of circuit printed layers;

a plurality of driver ICs attached to the PCB to transmit at least one signal and including a plurality of scan ICs inside, respectively;

a driver circuit connecting a first driver IC and a second driver IC among a plurality of the driver ICs together in a first direction;

a scan circuit connecting a first scan IC included inside the first driver IC and a second scan IC included inside the second driver IC together in the first direction without crossing with the driver circuit; and a controller controlling at least one of a plurality of the driver ICs, the driver circuit, or the scan circuit.

2. The display device of claim 1, wherein a plurality of the driver ICs generate first to fourth signals, respectively and wherein the first to fourth signals includes different informations, respectively.

3. The display device of claim 2, wherein the driver circuit includes a first circuit transmitting the first signal, a second circuit transmitting the second signal, a third circuit transmitting the third signal, and a fourth circuit transmitting the fourth signal and wherein the fourth circuit includes at least one sub-circuit.

4. The display device of claim 3, wherein the first to third circuits are formed parallel to the first direction to connect a plurality of the driver ICs and wherein the at least one sub-circuit is configured so that a pattern in a direction different from the first direction exists twice or less when connecting the first driver IC and the second driver IC in the first direction.

5. The display device of claim 3, wherein an area having the first and second driver ICs connected to each other therein has a rectangular shape and wherein the first to fourth circuits exist only within a first area having the first and second driver ICs connected to each other therein.

6. The display device of claim 5, wherein the first area includes first and second boundaries parallel to the first direction and wherein all the first to fourth circuits exist between the first and second boundaries.

7. The display device of claim 3, wherein the driver IC comprises a first pin having the first circuit connected thereto, a second pin having the second circuit connected thereto, a third pin having the third circuit connected thereto, and a fourth pin having the fourth circuit connected thereto.

* * * * *